US008339760B2

(12) United States Patent
Rabu et al.

(10) Patent No.: US 8,339,760 B2
(45) **Date of Patent: *Dec. 25, 2012**

(54) THERMAL PROTECTION CIRCUITS AND STRUCTURES FOR ELECTRONIC DEVICES AND CABLES

(75) Inventors: Stanley Rabu, Sunnyvale, CA (US); Ida Lo, Sunnyvale, CA (US); Cameron Frazier, San Carlos, CA (US); Mathias Schmidt, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 629 days.

This patent is subject to a terminal disclaimer.

(21) Appl. No.: 12/485,019

(22) Filed: Jun. 15, 2009

(65) Prior Publication Data

US 2010/0315752 A1 Dec. 16, 2010

(51) Int. Cl.
*H02H 5/04* (2006.01)
*H01R 13/66* (2006.01)

(52) U.S. Cl. ........................................ 361/120; 361/103

(58) Field of Classification Search .................. 361/103, 361/120; 257/49, 50, 664, 661, 662, 665, 257/686; 439/42, 620.01; 174/250
See application file for complete search history.

(56) References Cited

U.S. PATENT DOCUMENTS

| | | | | |
|---|---|---|---|---|
| 5,545,494 | A | 8/1996 | Trumble et al. | |
| 5,768,894 | A * | 6/1998 | Li et al. | 62/71 |
| 7,189,108 | B2 | 3/2007 | Takaya et al. | |
| 7,307,293 | B2 * | 12/2007 | Fjelstad et al. | 257/200 |
| 2005/0110134 | A1 * | 5/2005 | Tanoue | 257/723 |
| 2005/0174238 | A1 * | 8/2005 | Foseide | 340/568.4 |
| 2005/0205281 | A1 | 9/2005 | Bachinski et al. | |
| 2005/0255724 | A1 | 11/2005 | Picco et al. | |
| 2007/0139842 | A1 | 6/2007 | De Longhi | |
| 2009/0108416 | A1 * | 4/2009 | Fjelstad et al. | 257/664 |
| 2011/0104940 | A1 * | 5/2011 | Rabu et al. | 439/502 |

FOREIGN PATENT DOCUMENTS

| | | | |
|---|---|---|---|
| JP | 403111775 | A * | 5/1991 |
| WO | 2009/019801 | | 2/2009 |

* cited by examiner

*Primary Examiner* — Stephen W Jackson
*Assistant Examiner* — Angela Brooks
(74) *Attorney, Agent, or Firm* — Treyz Law Group; David C. Kellogg; G. Victor Treyz

(57) ABSTRACT

Connectors for cables such as a 30-pin connector are provided. The connectors may have thermal protection circuits and may carry a power supply voltage and a ground voltage. The thermal protection circuits may disable the power supply voltage when the temperature of the connector exceeds a threshold value. The connectors may have structures that encourage any dendritic failure to occur in a preferred location.

20 Claims, 17 Drawing Sheets

THERMAL PROTECTION CIRCUITS AND STRUCTURES FOR ELECTRONIC DEVICES AND CABLES

BACKGROUND

This invention relates to thermal protection circuits and structures for electronic devices and cables.

Portable electronic devices such as portable computers, handheld media players, and cellular telephones typically contain connectors that receive power signals from other electronic devices such as desktop computers and power adapters. The power signals are typically conveyed over cables such as Universal Serial Bus (USB) cables. A user who desires to use a portable electronic device or who desires to charge a battery in the portable electronic device may connect the device to a source of electricity such as a power adapter using a cable.

Conventional cables and connectors for cables and electronic devices can fail in the presence of moisture. In particular, when the cables or connectors become wet, conductive dendritic structures form in the dielectric material being used to isolate conductive structures that are at different potentials in the cables or conductors. Once a conductive dendritic structure forms in the dielectric material between the conductors, the two conductors are effectively shorted together. This short circuit condition can lead to excessive current and an undesirable buildup of heat. In some situations, the heat that is produced may melt part of the cable or connector and cause a failure.

It would therefore be desirable to be able to provide thermal protection circuits and structures for electronic devices and cables.

SUMMARY

Electronic devices such as desktop computers, portable computers, handheld devices, and power adapters and cables that interconnect the electronic devices may include thermal protection circuits. The thermal protection circuits may include temperature-sensitive devices such as temperature sensors. Power cutoff switches in the thermal protection circuitry may be used to prevent excessive currents from developing.

If desired, a cable may include structures that force moisture-related shorts (e.g., dendritic shorts) to form in a particular location. With this type of arrangement, a power cutoff switch may be provided that can cut off power to the particular location. If desired, the power cutoff switch can be located near the particular location (i.e., adjacent to one or more structures that force moisture-related shorts to form in the particular location).

With one suitable arrangement, a cable may include thermal protection circuitry such as a temperature sensor and a power cutoff switch. The cable may include two connectors connected together by a plurality of conductors. If desired, the temperature sensor and the power cutoff switch may be located in a single connector. With this type of arrangement, the power cutoff switch may be configured to cut off power to a portion of the connector when the temperature of the connector exceeds a threshold value.

With another arrangement, the temperature sensor may be located in a first connector and the power cutoff switch may be located in a second connector. In this configuration, the power cutoff switch may cut power to the first connector when the temperature sensor determines that the temperature of the first connector has exceeded a threshold temperature.

Connectors in the cable may include structures that intentionally encourage dendritic growths. For example, a connector may include a printed circuit board with exposed regions that are not covered by a material such as a solder mask. The printed circuit board may include conductive traces that are arranged to provide an area with a relatively high voltage gradient in the exposed regions. With this type of arrangement, the exposed regions of the printed circuit board may hold moisture so that the moisture is exposed to a relatively high voltage gradient. This may provide relatively favorable conditions for dendrite formation (e.g., conditions favorable to forming shorts between the conductive traces).

If desired, the temperature sensor may be provided in one of the electronic devices. In addition or alternatively, the power cutoff switch may be provided in one of the electronic devices.

Further features of the invention, its nature and various advantages will be more apparent from the accompanying drawings and the following detailed description of the preferred embodiments.

DETAILED DESCRIPTION

Figure 1:
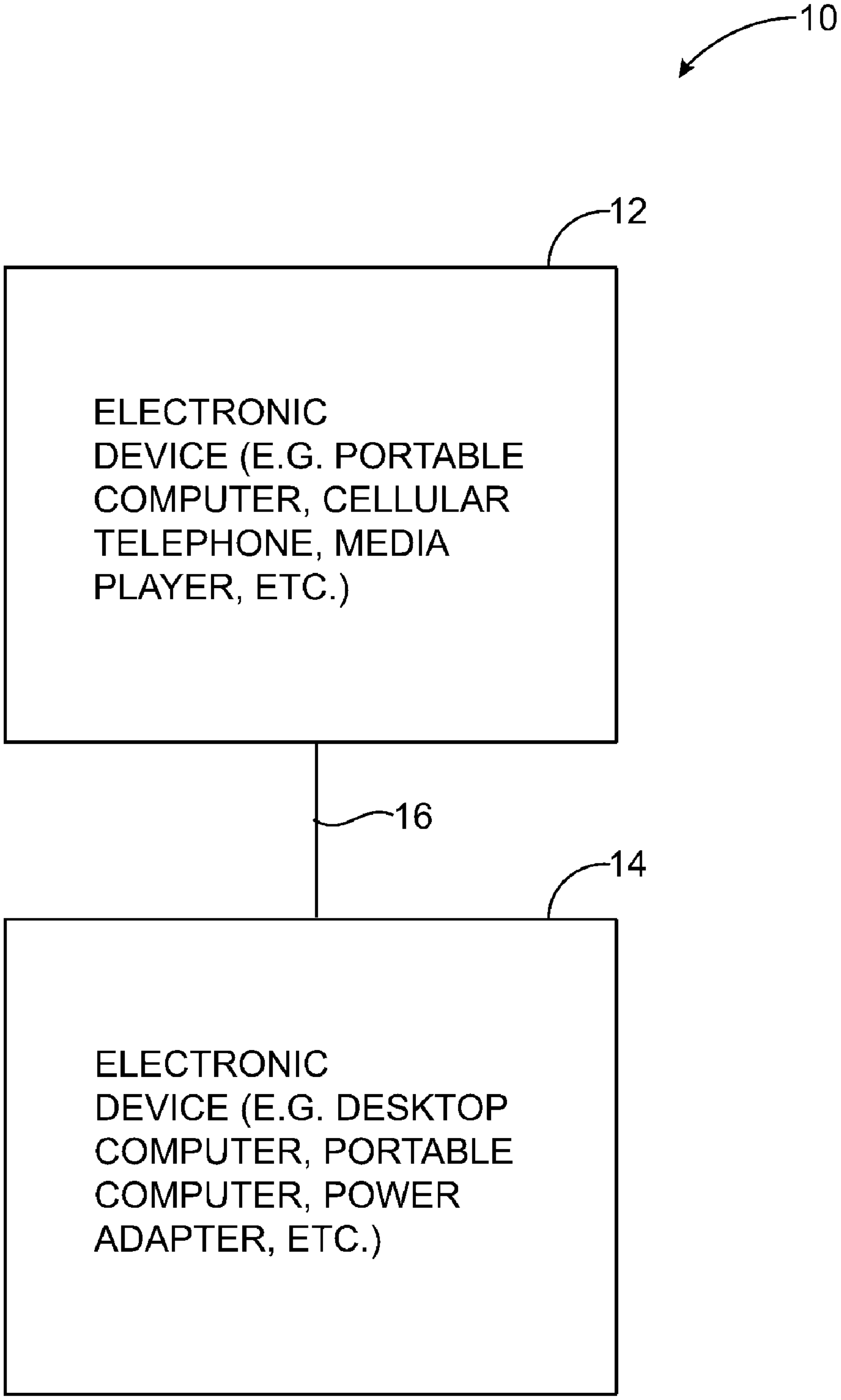
FIG. 1 is a schematic diagram of illustrative electronic devices that may communicate over a communications path that may include thermal protection circuits in accordance with an embodiment of the present invention.

Electronic components such as electronic devices and other equipment may be interconnected using wired paths. As an example, a cable may include conductors that convey power signals and data signals between two interconnected electronic devices. A cable may, for example, convey power between a power adapter and a portable electronic device. The cable may include connectors at one or both of its ends. These cable connectors may plug into mating connectors. For example, a cable connector at one end of a cable may plug into a connector in a power adapter and a cable connector at the other end of the cable may plug into a connector in an electronic device. The conductors in the cable couple the connectors at either end of the cable to each other. Pins (or other suitable contacts) may be provided in each connector that mate with corresponding pins in the equipment that mates with the connectors. For example, a cable may have a 30-pin connector. Pins in the 30-pin connector receive power from the conductors in the cable and deliver power with corresponding pins in a media player, cellular telephone, or other electronic device.

Cables and their connectors are sometimes inadvertently exposed to moisture. In these circumstances, shorts can form that can lead to excessive temperatures and equipment damage. In a typical failure scenario, a user may spill a liquid onto a connector. When moisture infiltrates the connector, the moisture can interact with the conductive portions of the connector, leading to dendrite growth and short circuits. Initially, dendrites may be too weak to sustain large currents. However, dendrites will eventually grow sufficiently to form a high-current path between the conductive portions of the connector (i.e., conductors at different potentials). The current that flows along the high-current path will sometimes be sufficient to burn plastic housing structures in the connector. Burnt plastic may then lead to conductive carbon deposits that contribute to the undesired short circuit condition. At this point, the connector may be permanently damaged and, if the generated current and heat was sufficient, the device into which the cable connector was plugged or other such equipment may also be damaged.

If desired, cables may be provided with thermal protection circuits and structures that help limit the damage caused by moisture-induced dendrite growth and resulting short circuits. Electronic devices may also be provided with thermal protection circuits and structures (in addition to, or instead of, providing the cables with thermal protection circuits and structures).

For example, a cable may include thermal protection circuitry that reduces or eliminate power supply signals flowing to a connector in the cable when it is determined that the temperature of the connector has risen above a given threshold. The given threshold may be relatively high, so that any moisture in the connector is removed by heating (i.e., the connector is dried) before the power supply signals are deactivated. Because the connector may be fully dried out by the heating process, the connector will not contain residual pockets of moisture that might result in additional dendrite formation and additional short circuits.

With one suitable arrangement, cables may include thermal protection structures in connectors that encourage moisture-related shorts (e.g., shorts resulting from dendritic growths) to occur in one or more specific locations in the connectors. With this type of arrangement, the cables may include one or more switches that can reduce or eliminate power supply signals in those specific locations.

An illustrative system in accordance with an embodiment of the present invention is shown in FIG. 1. As shown in FIG. 1, system 10 may include a first electronic device such as electronic device 12 and a second electronic device such as electronic device 14. A wired path such as path 16 may be used to connect electronic device 12 to electronic device 14. In a typical arrangement, path 16 includes one or more conductive lines and a connector at each end. The conductive lines in path 16 may be used to convey signals such as data and power signals over path 16. There may, in general, be any suitable number of lines in path 16. For example, there may be two, three, four, five, six, or more than six separate lines. These lines may be part of one or more cables. Cables may include solid wire, stranded wire, shielding, single ground structures, multi-ground structures, twisted pair structures, or any other suitable cabling structures. Extension cord and adapter arrangements may be used as part of path 16, if desired. Path 16 may be a cable and path 16 may sometimes be referred to herein as cable 16.

Electronic device 12 may be a desktop or portable computer, a portable electronic device such as a cellular telephone or other handheld electronic device that has wireless capabilities, equipment such as a television or audio receiver, a handheld media player, or any other suitable electronic equipment. Electronic device 12 may be provided in the form of stand-alone equipment (e.g., a handheld device that is carried in the pocket of a user) or may be provided as an embedded system.

Electronic device 14 may be any suitable device that works in conjunction with electronic device 12. Examples of electronic device 14 include a portable electronic device, a cellular telephone or other handheld electronic device that has wireless capabilities, equipment such as a television or audio receiver, a handheld media player, or any other suitable electronic equipment. With one suitable arrangement, electronic device 14 may be a power adapter such as a power adapter that converts household power (e.g., alternating-current signals at a nominal voltage of approximately 120 volts or at a nominal voltage of approximately 230 volts, depending on location) or that converts power from an automobile (e.g., direct-current signals at a nominal voltage of approximately 12 volts) to power suitable for use by electronic device 12 (e.g., direct-current power signals at ground and five volts). With this type of arrangement, electronic device 12 may be a portable electronic device such as a portable computer, a cellular telephone, or a media player that receives power from the power adapter 14.

Figure 2:
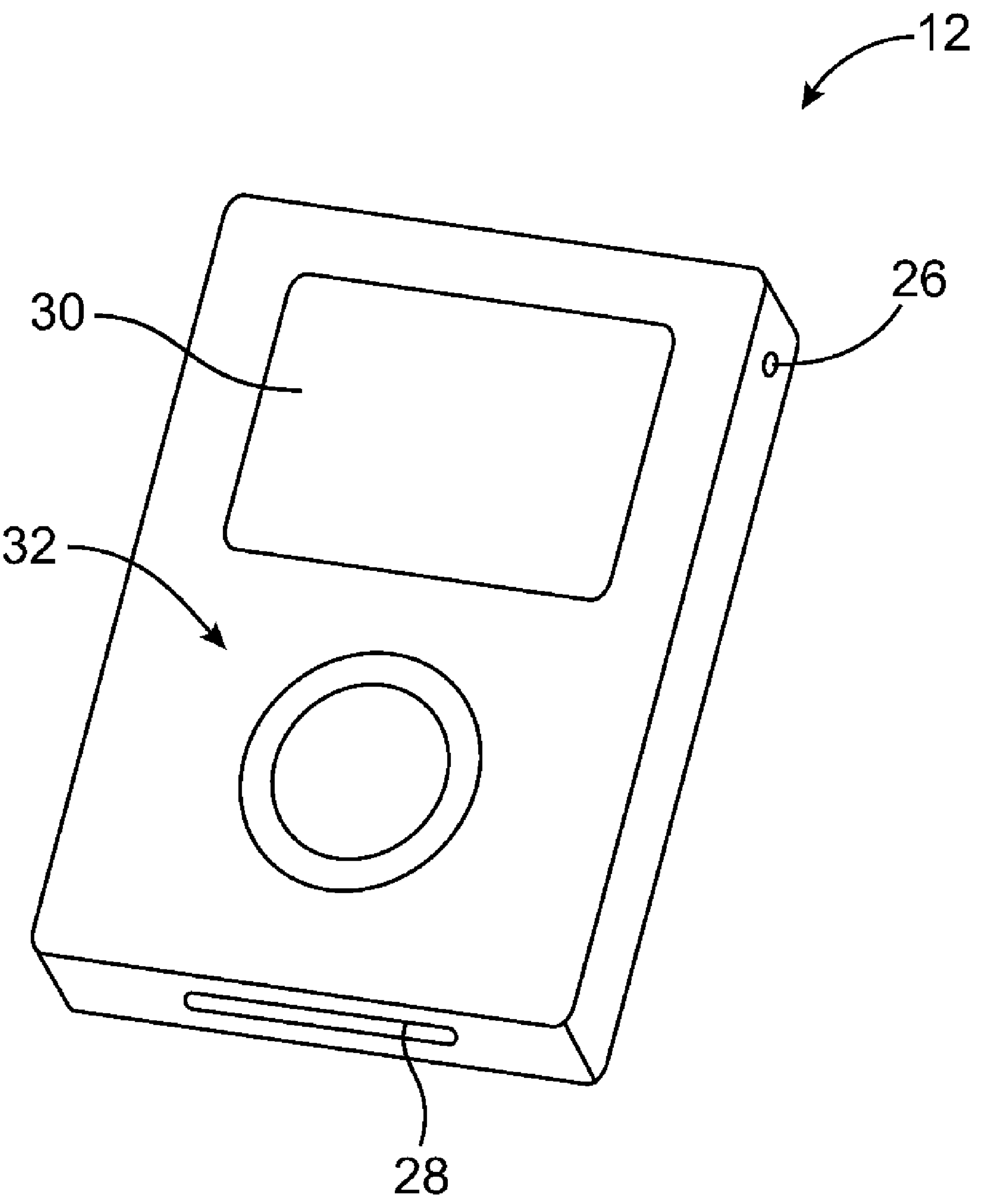
FIG. 2 is a perspective view of an illustrative electronic device such as a media player, cellular telephone, or hybrid device showing how the electronic device may have a connector that mates with other electronic devices and accessories in accordance with an embodiment of the present invention.

An illustrative example of electronic device 12 is shown in FIG. 2. In the example of FIG. 2, device 12 is shown as having a screen such as screen 30 and a user input device such as user interface device 32. Device 32 may be, for example, a click wheel, a touch pad, keys, switches, or other suitable buttons, a touch screen, etc. Screen 30 may be, for example, a touch screen that covers a large fraction of the front face of device 12. Audio jack 26 may be provided to allow a user to connect a headset or other accessory to device 12. Device 12 may include connectors such as connector 28. Connector 28 may be a 30-pin connector, a Universal Serial Bus (USB) port, a connector that couples to a connector in path 16 of FIG. 1, etc.

Figure 3:
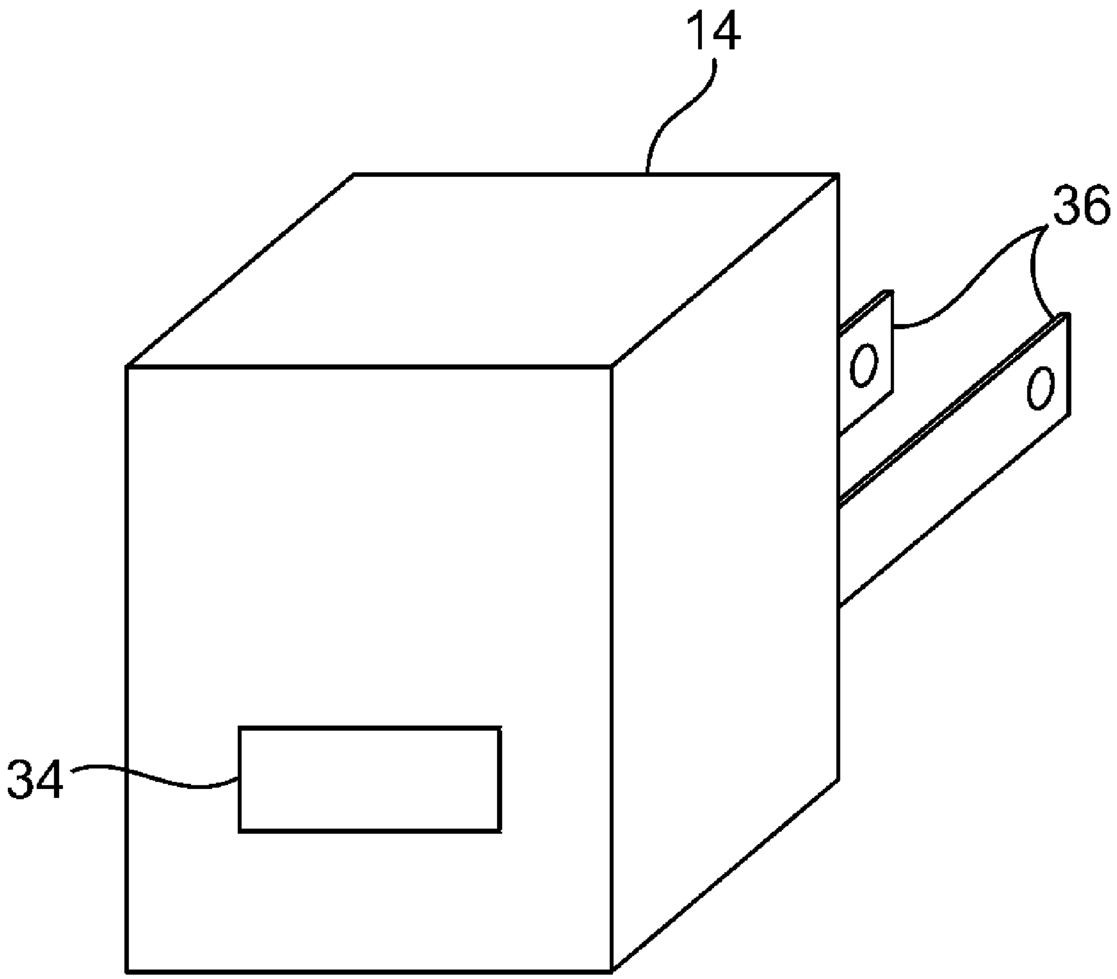
FIG. 3 is a perspective view of an illustrative electronic device such as a power adapter showing how the electronic device may have a connector that mates with other electronic devices and that conveys power signals to the other electronic devices in accordance with an embodiment of the present invention.
Figure 4:
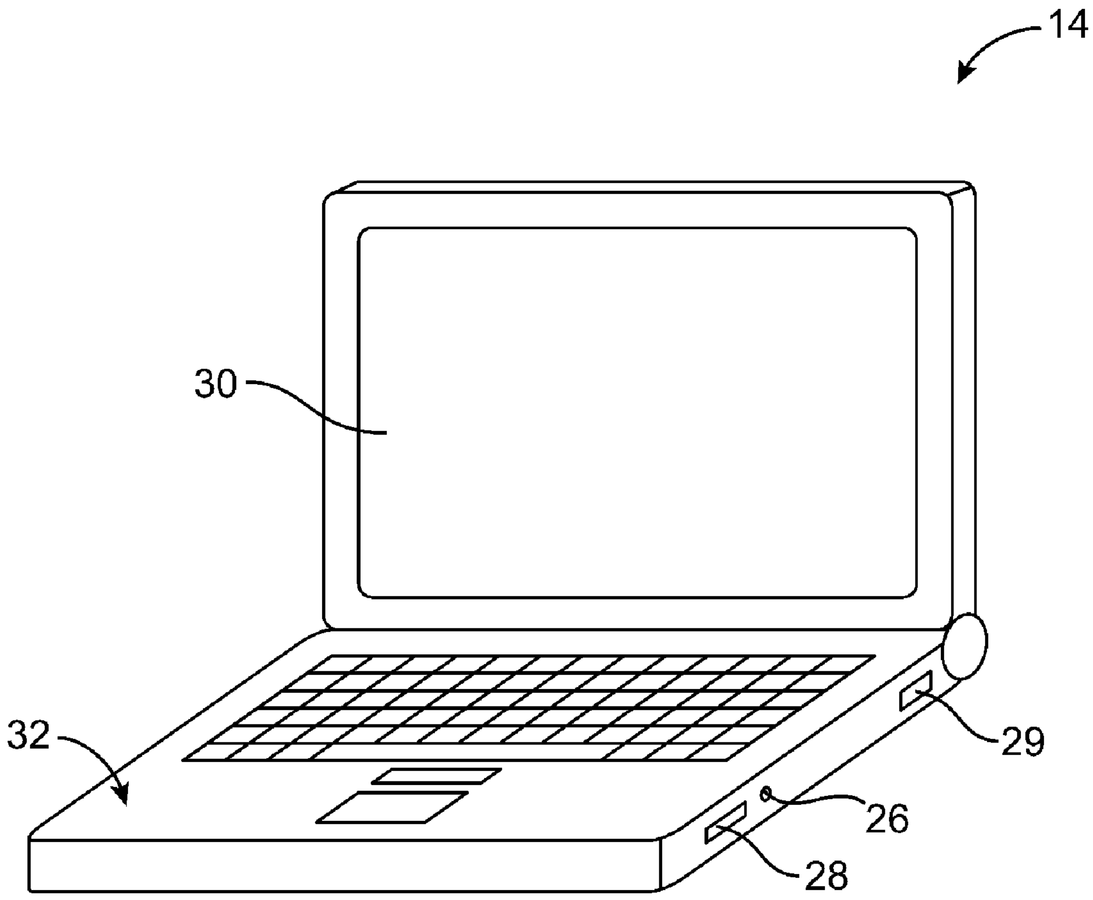
FIG. 4 is a perspective view of an illustrative electronic device such as a portable computer that may have one or more connectors that can mate with other electronic devices in accordance with an embodiment of the present invention.

Illustrative examples of electronic device 14 are shown in FIGS. 3 and 4. In the example of FIG. 3, device 14 is a power adapter that converts electricity into an appropriate form for use by another electronic device 12. With this type of arrangement, device 14 may include power connectors such as connectors 36 (prongs) that couple to an electricity outlet and a connector such as connector 34. Connector 34 may be a Universal Serial Bus (USB) port connector, a 30-pin connector, any other suitable connector. Connector 34 may mate with a connector in path 16 of FIG. 1 and may be used to convey power signals over path 16 from device 14 to device 12 (e.g., for powering device 12 and for charging a battery in device 12).

In the example of FIG. 4, device 14 is a portable computer. Portable computer 14 of FIG. 4 has a display such as display 30 and user input equipment such as touch pad and keys 32. As shown in FIG. 4, device 14 may have an audio jack such as jack 26 for receiving a mating audio plug. Device 14 may also have connectors such as connector 28 and connector 29. Connectors 28 and 29 may be 30-pin connectors, Universal Serial Bus (USB) ports, connectors that couple to one or more connectors in path 16 of FIG. 1, etc.

Figure 5:
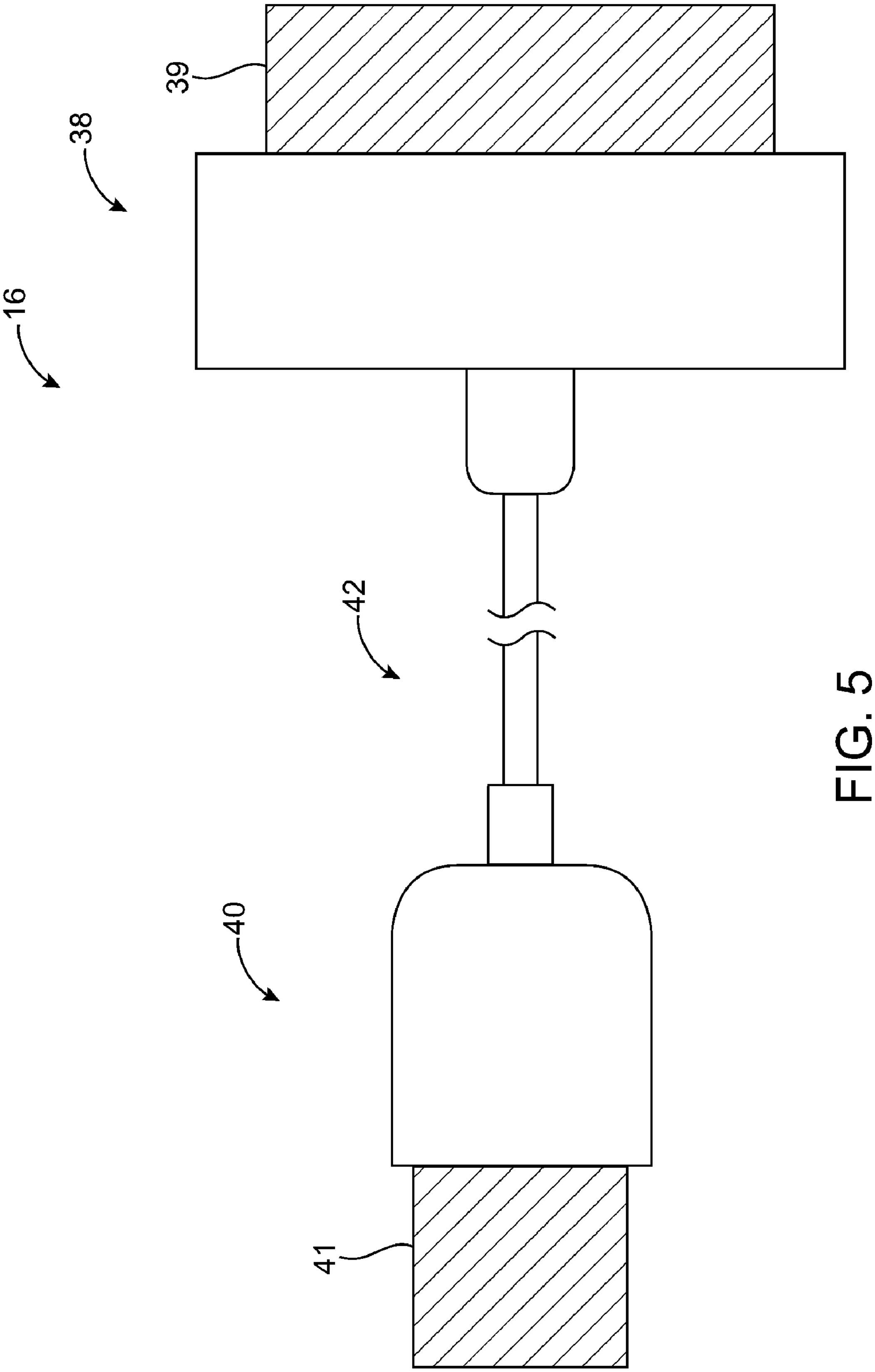
FIG. 5 is a top view of an illustrative cable that may form a communications path between two electronic devices and that may include thermal protection circuits and structures in accordance with an embodiment of the present invention.

An illustrative example of a cable that may form a communications path between electronic devices 12 and 14 is shown in FIG. 5. In the example of FIG. 5, cable 16 includes first connector 38, second connector 40, and communications path 42 between connectors 38 and 40. Connector 38 may be a 30-pin connector that mates with connector 28 (FIG. 2) of electronic device 12. If desired, connector 40 may be a Universal Serial Bus (USB) connector that can couple to a connector such as connector 29 (FIG. 4) of electronic device 14 and that can be coupled to connector 34 (FIG. 3) of power adapter 14. Communications path 42 may include any suitable number of conductive lines and may convey signals such as data and power signals between connectors 38 and 40. If desired, connector 38 may include a male connector portion such as portion 39 that is received by a female connector such as connector 28 (FIGS. 2 and 4) and connector 40 may include a male connector portion such as portion 41 that is received by a female connector such as connector 34 (FIG. 3) or connector 29 (FIG. 4). In general, cable 16 may be formed using any suitable combination of male and female connectors. If desired, one end of cable 16 may be integrated into an electronic device (e.g., a power adapter).

As described above, conventional cables and connectors for cables and electronic devices can fail in the presence of excessive moisture. In particular, when the cables or connectors become wet, conductive dendritic structures will form in dielectric material between adjacent conductive structures that are at different potentials in the cables or connectors. Once a conductive dendritic structure forms in the dielectric material between the two conductive structures, the two structures are effectively shorted together, thereby leading to a buildup of heat that may melt surrounding material.

Figure 6:
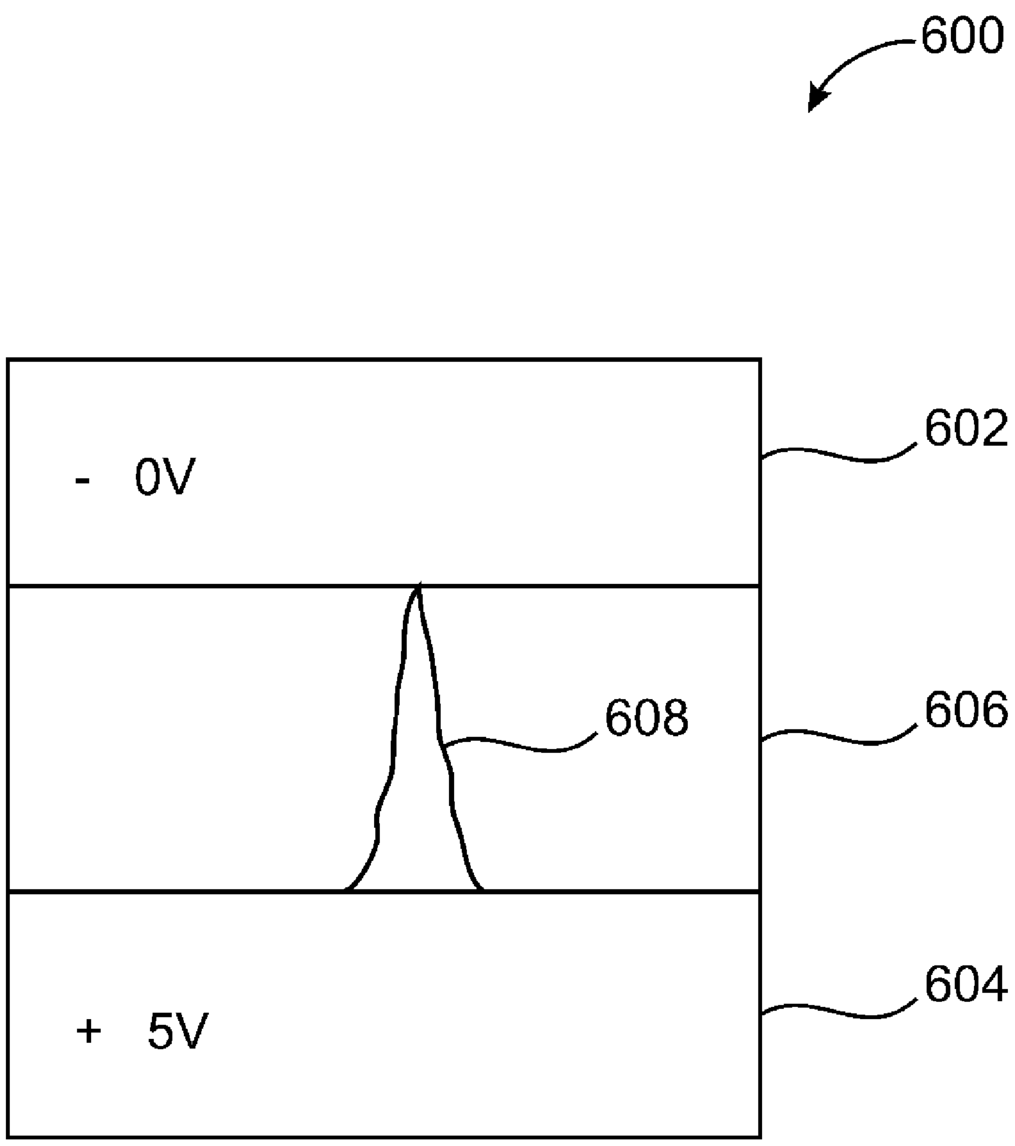
FIG. 6 (PRIOR ART)
FIG. 6 is a diagram of a dendritic structure of the type that forms in a conventional connector in the presence of moisture between metal surfaces that are at different potentials in the connector.

A schematic diagram that shows how a dendritic structure forms in a conventional connector is shown in FIG. 6. As shown in FIG. 6, connector 600 includes a first conductive structure 602 at an electrical potential of zero volts and a second conductive structure 604 at an electrical potential of five volts. Connector 600 also includes a dielectric material 606 that provides electrical insulation between the two conductive structures 602 and 604. During operation, a voltage develops across conductive structures 602 and 604 (e.g., a five volt voltage difference). In the presence of moisture, this can lead to the formation of dendrites such as dendritic structure 608 in material 606. Dendritic structure 608 is initially formed from metal (from structures 602 and 604) that becomes dissolved and is subsequently pulled across dielectric 606 (via the voltage gradient between structures 602 and 604). Once a conductive path is formed between structures 602 and 604 in this way, a large current will flow between the structures 602 and 604 which can carbonize the dielectric 606. When dielectric 606 is carbonized, carbon material is deposited along dendritic structure 608. Because the deposited carbon material may be even more conductive than the initial dendritic structure, the result is often a self-sustaining short between structures 602 and 604 which leads to a buildup of further heat in connector 600 and additional damage.

Figure 7:
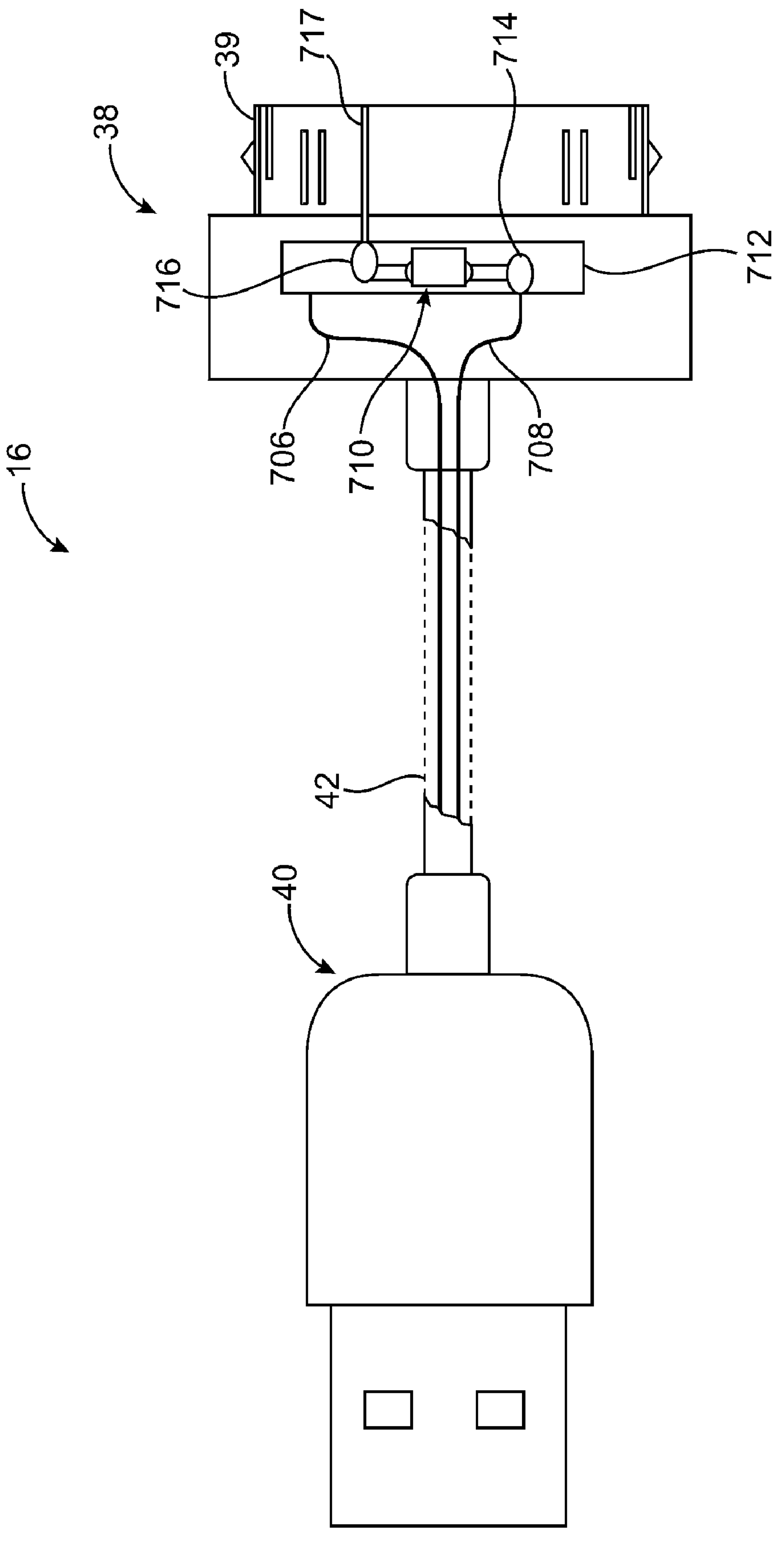
FIG. 7 is a top view of an illustrative cable that may include a connector that has thermal protection circuitry which can deactivate power supply lines in the connector in response to rising temperatures in the connector in accordance with an embodiment of the present invention.

An example of a cable that may include a connector with thermal protection circuitry is shown in FIG. 7. As shown in FIG. 7, cable 16 may include connectors 38 and 40. With one suitable arrangement, connector 40 may be a male Universal Serial Bus (USB) connector that couples to a female Universal Serial Bus (USB) port such as connector 34 of FIG. 3 and connector 29 of FIG. 4. Connector 38 may be a 30-pin connector that couples to a 30-pin connector such as connector 28 of FIGS. 2 and 4.

With one arrangement, conductors such as conductors 706 and 708 in path 42 may convey signals between connectors 38 and 40. For example, conductors 706 and 708 may carry power supply signals between the two connectors of cable 16. As an example, conductor 706 may carry ground power supply signals and conductor 708 may carry positive power supply signals (e.g., signals at a potential of approximately 5.0 volts above ground). Conductor 706 may be a ground conductor and conductor 708 may be a power conductor. With this type of arrangement, there may be a potential difference in connector 38 between two conductive surfaces that can, under some circumstances, be susceptible to dendritic growth.

If desired, connector 38 may include thermal protection circuitry 710. As one example, thermal protection circuitry 710 may be mounted on a printed circuit board 712 and, if desired, may be mounted between contacts 714 and 716. Contact 714 may be coupled to conductor 708 and contact 716 may be coupled to pin 717 (e.g., a male pin in connector 38 extending from the connector). There may be a conductive trace between the two contacts 714 and 716. As one example, the thermal protection circuitry 710 may be mounted along the conductive trace.

Thermal protection circuitry 710 may include a temperature-sensitive device such as a temperature sensor and a voltage (power) cutoff switch (as examples). With this type of arrangement, thermal protection circuitry 710 may be configured to detect increasing temperatures in connector 38 (which may be indicative of a dendritic growth creating a short between conductors 706 and 708). In response to increasing temperatures in connector 38, circuitry 710 (e.g., a switch in circuitry 710) may be configured to cut off a power supply in connector 38 by electrically isolating contact 714 from contact 716. With this type of arrangement, the potential of contact 716 may be reduced towards ground. Assuming that the increasing temperatures were a result of a short in connector 38, circuitry 710 may be able to eliminate the cause of the increasing temperatures (e.g., by cutting off the voltage supply to contact 716). In general, thermal protection circuitry such as circuitry 710 may include any suitable temperature-sensitive device for determining when the power cutoff switch cuts off power to connector 38. For example, circuitry 710 may include a temperature-sensitive fuse or other suitable device that changes state depending on ambient temperature.

Figure 8:
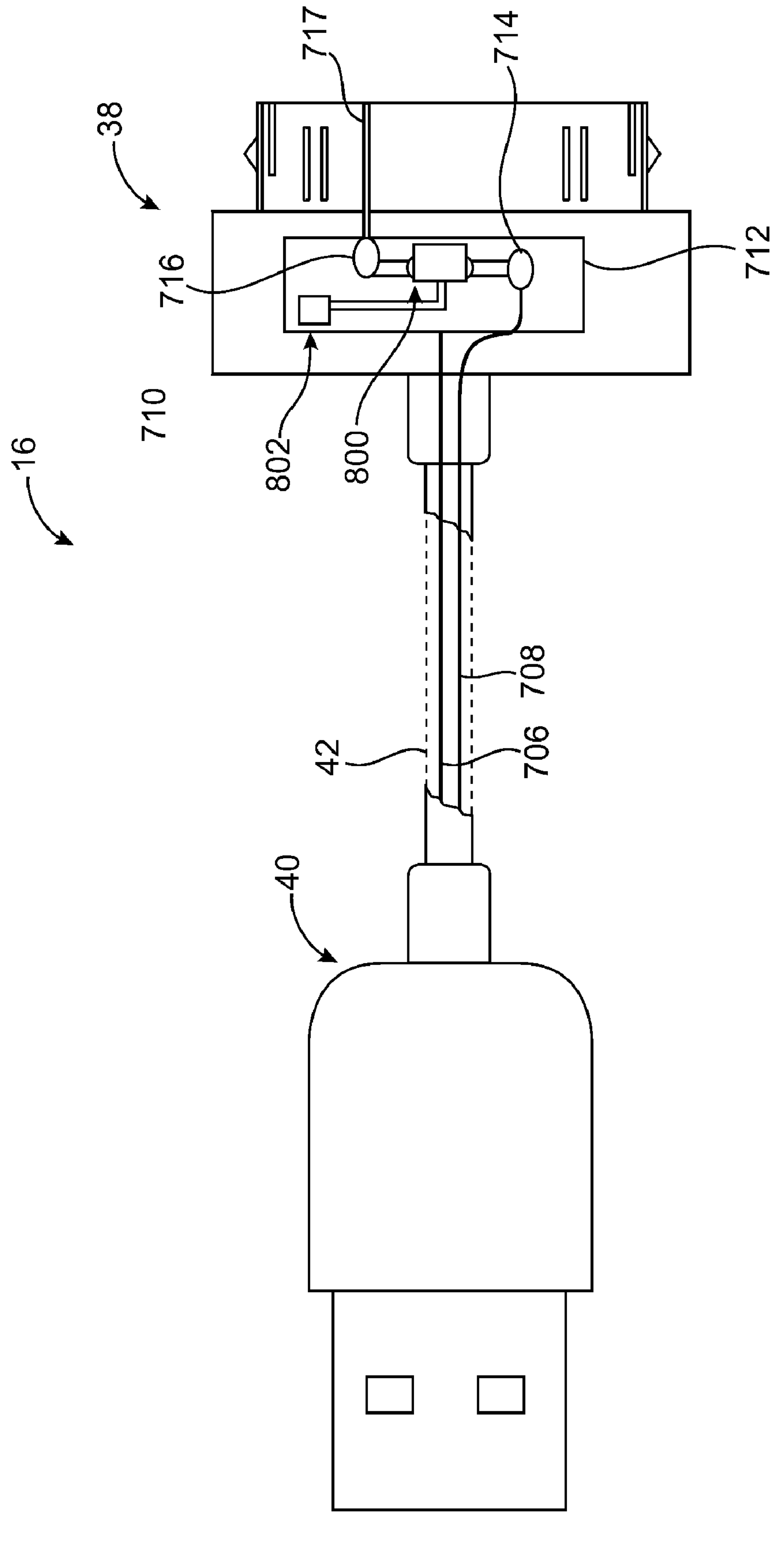
FIG. 8 is a top view of an illustrative cable that may include a connector that has a temperature sensor and a power cutoff switch that can deactivate power supply lines in the connector in response to rising temperatures in the connector in accordance with an embodiment of the present invention.

As shown in FIG. 8, thermal protection circuitry such as thermal protection circuitry 710 of FIG. 7 may include a separate power cutoff switch 800 and temperature sensor 802. If desired, control circuitry associated with the thermal protection circuitry may be included in switch 800 or in sensor 802. Temperature sensor 802 may be mounted in any suitable location in connector 38.

As one example, connector 40 may be coupled to a power adapter 14, connector 38 may be coupled to a portable electronic device 12 with a battery, and cable 16 may be used in conveying electrical power from the power adapter to the portable electronic device (e.g., to charge the battery in the electronic device). In this example, thermal protection circuitry 710 may shut off power to contact 716 and pin 717 (as example) when the temperature in the connector 38 exceeds a threshold level. This may help to protect electronic device 12 from excessive heat.

Because the power cutoff in the arrangement of FIGS. 7 and 8 occurs inside connector 38, the actions of thermal protection circuitry 710 do not shut off the power supply voltages supplied to connector 38 by conductors 706 and 708 (i.e., upstream voltages remain live). If desired, thermal protection circuitry may be provided that can deactivate one or more of the conductors in path 42 that supply power to connector 38. With this type of arrangement, the thermal protection circuitry may be able to provide thermal protection from a short in connector 38 regardless of the location of the short (e.g., by shutting off power to the connector 38 from outside the connector 38).

Figure 9:
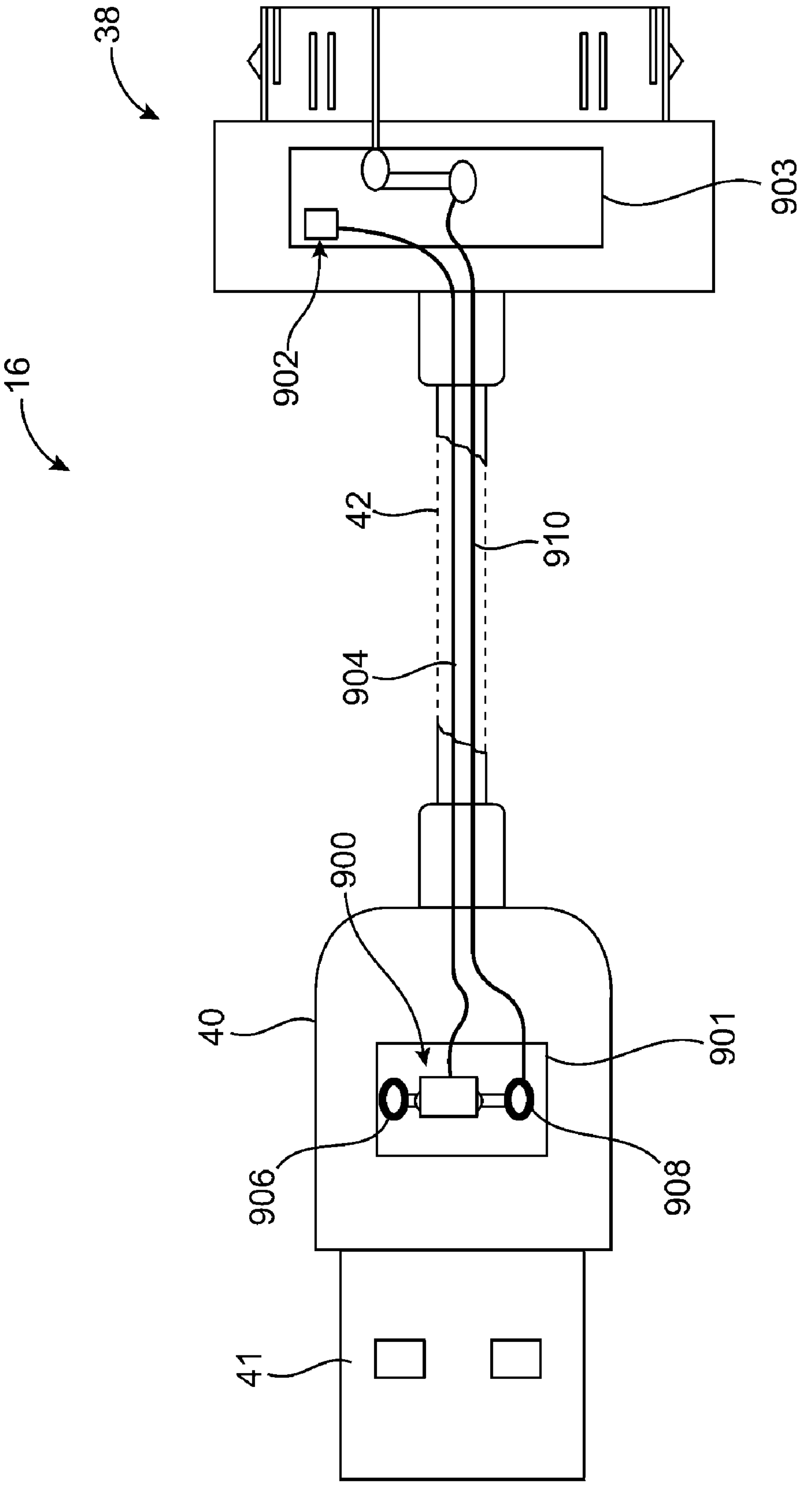
FIG. 9 is a top view of an illustrative cable that may include a first connector with a temperature sensor and a second connector with a power cutoff switch that can deactivate power supply lines to the first connector in response to rising temperatures in the first connector in accordance with an embodiment of the present invention.

An example of thermal protection circuitry that may be used to shut off power to connector 38 is shown in FIG. 9. As shown in FIG. 9, cable 16 may include thermal protection circuitry such as circuit 900 in connector 40 and sensor 902 in connector 38. Circuit 900 may be a power cutoff switch and circuit 902 may be a temperature sensor (as examples).

Thermal protection circuitry such as circuit 900 in connector 40 may be mounted on a printed circuit board such as board 901 and, if desired, may be connected to a temperature sensor 902 in connector 38 over path 904. Temperature sensor 902 may be mounted on a printed circuit board 903 in connector 38. With one suitable arrangement, thermal protection circuit 900 may include a switch coupled between contacts 906 and 908 of printed circuit board 901. As an example, contact 906 may receive a positive power supply voltage from electronic device 14 (e.g., over male connector portion 41 of connector 40). During normal operation, switch 900 may electrically connect contact 906 to contact 908 and conductor 910. In this example, the positive power supply voltage may be conveyed to connector 38 over conductor 910 (e.g., one of a plurality of conductors in path 42).

Switch 900 may receive control signals from sensor 902 over path 904 that are indicative of the current temperature of connector 38. When the temperature of connector 38 exceeds a threshold temperature such as a threshold value less than 85° C., a threshold value of 85° C., a threshold value of 90° C., a threshold value of 95° C., a threshold value of 100° C., a threshold value of greater than 100° C., or any other suitable threshold temperature, sensor 902 may send a control signal to switch 900 directing switch 900 to shut off power by forming an open circuit in one or more power supply lines to connector 38. As an example, switch 900 may isolate contact 906 from contact 908, thereby cutting off power to the conductor 910 that was previously providing power to connector 38. With this type of arrangement, thermal protection circuits 900 and 902 may work together to protect connector 38 from overheating. For example, if a dendritic growth in connector 38 shorts conductor 910 to a ground potential, circuits 900 and 902 can detect rising temperatures resulting from the short and can shut power off to connector 38 (e.g., shut off power to conductor 910).

Figure 10:
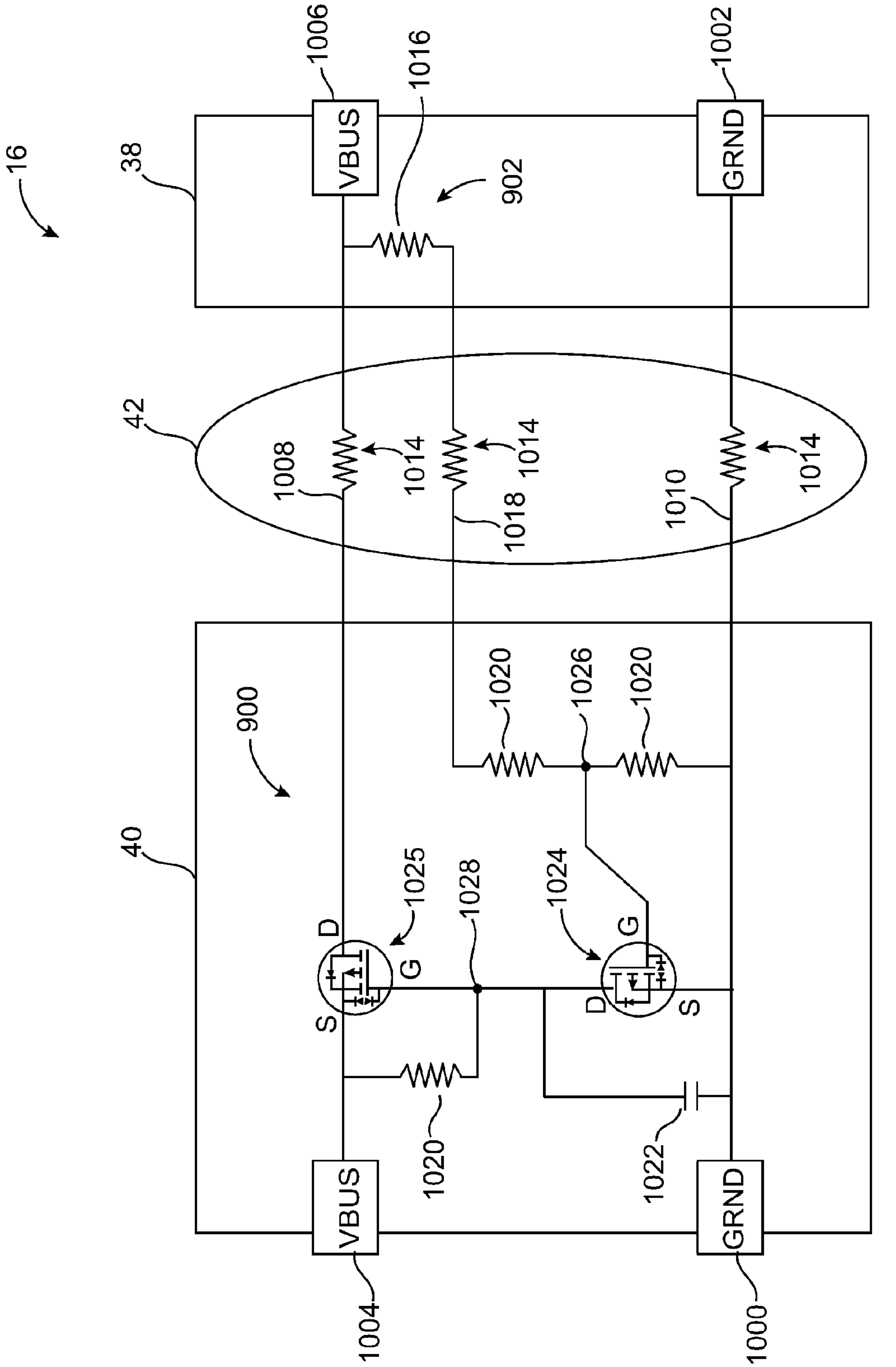
FIG. 10 is a circuit diagram of the illustrative cable of FIG. 9 showing how the temperature sensor in the first connector may be formed from a thermistor that can be used in controlling latch circuitry in the second connector to deactivate the power supply lines in accordance with an embodiment of the present invention.

An illustrative circuit diagram of the arrangement of FIG. 9 is shown in FIG. 10. As shown in FIG. 10, cable 16 may convey two or more voltages between external contacts in connector 38 and external contacts in connector 40. For example, cable 16 may convey a ground voltage between ground (GRND) contact 1000 of connector 40 and ground (GRND) contact 1002 of connector 38. Cable 16 may convey a positive power supply voltage between contact 1004 of connector 40 and contact 1006 of connector 38 (e.g., the VBUS contacts 1004 and 1006). With one suitable arrangement, the positive power supply voltage may be conveyed over conductor 1008 and the ground voltage may be conveyed over conductor 1010. The circuit diagram of FIG. 10 also shows how each of the conductors in path 42 may have a non-zero resistance 1014.

As shown in the example of FIG. 10, temperature sensor 902 may be formed from a temperature-sensitive resistor such as thermistor 1016 (i.e., a resistor with a resistance that varies with temperature) coupled to power cutoff switch 900 over conductors 1008 and 1018.

Switch 900 may include a number of circuit components such as transistors, resistors, capacitors, etc. that allow switch 900 to block power delivery when desired (i.e., by interrupting the flow of current). Switches such as switch 900 are sometimes referred to as "power cutoff" switches because when a given switch is placed in its open state, the power that would otherwise be delivered is blocked. Switches such as switch 900 may also be referred to as voltage cutoff switches, cutoff switches, switches, current cutoff switches, etc.

With one suitable arrangement, power cutoff switch 900 may include three resistors 1020. Resistors 1020 may have any suitable resistance. As one example, resistors 1020 may each have a resistance of approximately one million ohms. If desired, power cutoff switch 900 may include a capacitor such as capacitor 1022. As an example, capacitor 1022 may have a capacitance of approximately 0.01 microfarads. Power cutoff switch 900 may also include circuit elements 1024 and 1025 (e.g., n-channel and p-channel transistors). With one arrangement, power cutoff switch 900 may be a latching circuit.

When the resistance of thermistor 902 drops above a below threshold level (corresponding to the temperature in connector 38 rising above a threshold level), the voltage on node 1026 may rise above a level that causes circuitry 900 to shut off power to connector 38 by isolating conductor 1008 from contact 1004. Alternatively, thermistor 902 may have a resistance which increases with increasing temperatures and circuitry 900 may shut off power to connector 38 when the voltage on node 1026 drops below a threshold value (e.g., when the resistance of thermistor 902 rises above a corresponding threshold resistance).

When connector 40 is disconnected from electronic device 14, the contact 1004 may no longer be powered and the power cutoff switch 900 may reset (e.g., so that if the connector 40 is reconnected to electronic device 14 contact 1004 may be coupled to contact 1006). The thermal protection circuitry of cable 16 may be able to cut power off to connector 38 if a short occurs in connector 38 and/or an excessive rise in temperature occurs in connector 38, thereby protecting connector 38 from excessive damage.

In the arrangement of FIG. 10, when the temperature of connector 38 rises above a threshold level, the resistance of thermistor 902 may drop. The drop in resistance of thermistor 902 may, in turn, cause the voltage at node 1026 to rise, thereby turning on transistor 1024. As transistor 1024 is turned on, the voltage on node 1028 will drop. The lower voltage on node 1028 may, in turn, turn off transistor 1025 and isolate contact 1006 from contact 1004 (e.g., shut off power to connector 38).

Figure 11:
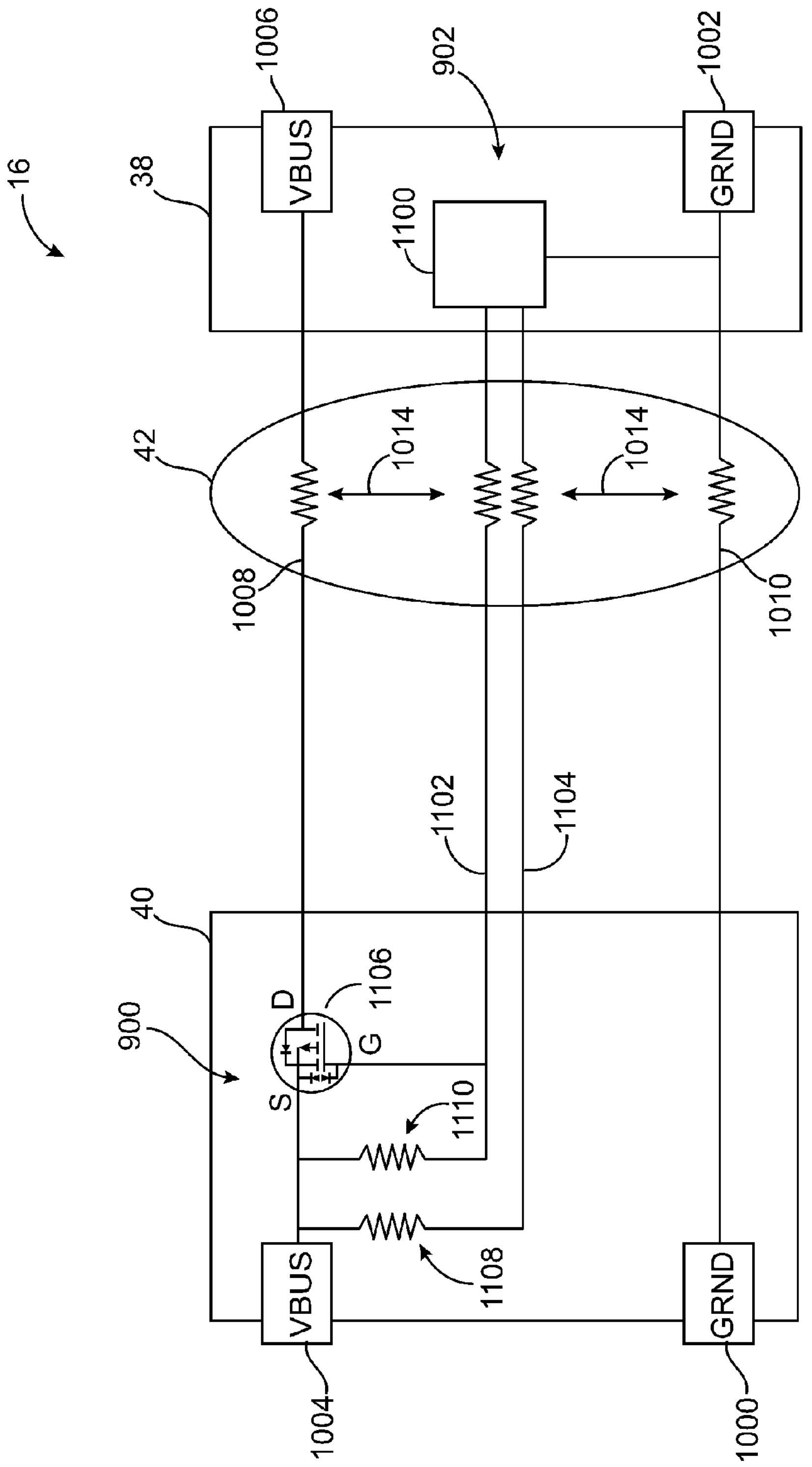
FIG. 11 is a circuit diagram of the illustrative cable of FIG. 9 showing how the temperature sensor in the first connector may be formed from circuitry that can control the power cutoff switch in the second connector to deactivate the power supply lines in accordance with an embodiment of the present invention.

Another illustrative circuit that may be associated with the arrangement of FIG. 9 is shown in FIG. 11. As shown in the circuit diagram of FIG. 11, connectors 38 and 40 may include contacts 1000, 1002, 1004, and 1006, and may be interconnected by conductors 1008 and 1010. Similarly, each of the conductors in cable 42 may have a finite resistance 1014. Temperature sensor 902 in connector 38 may include control circuitry for controlling a power cutoff switch 900 in connector 40. For example, temperature sensor 902 may be provided as an integrated circuit 1100 that combines a temperature sensor and control circuitry for controlling switch 900. Circuit 1100 may sometimes be referred to here as control and temperature sensing circuitry 1100.

Power cutoff switch 900 may include a transistor 1106 coupled between contact 1004 in connector 40 and contact 1006 in connector 38 (e.g., between contact 1004 and conductor 1008). Transistor 1106 may be used to control whether or not connector 38 is powered. For example, when excessive temperatures are detected by circuitry 1100, transistor 1106 may be turned off to isolate connector 38 from the positive power supply voltage supplied to cable 16 over contact 1004 (from electronic device 14).

With one suitable arrangement, control and temperature sensing circuitry such as circuitry 1100 may be powered by power supply signals on conductor 1104 (and by a ground voltage on conductor 1010). If desired, conductor 1104 may include a resistor such as resistor 1108 that limits the maximum amount of power that connector 38 can receive from conductor 1104. With this type of arrangement, a short between conductor 1104 and ground (i.e., conductor 1010) in connector 38 may not lead to excessive heat buildup, because of the limiting influence of resistor 1108. Resistor 1108 may have any suitable resistance (e.g., a resistance that is low enough to provide power to circuitry 1100 and high enough to protect against excessive heat buildup in the event of a short).

Control and temperature sensing circuitry 1100 may control transistor 1106 by asserting appropriate signals onto conductor 1102. For example, when transistor 1106 is implemented as an n-channel transistor, circuitry 1100 may turn off transistor 1106 by applying a ground voltage to conductor 1102 and circuitry 1100 may turn on transistor 1106 by applying a positive power supply voltage to conductor 1102.

Power cutoff switch 900 may, if desired, include resistor 1110. Resistor 1110 may be used to provide latching functionality to the power cutoff switch 900. For example, when connector 40 is being connected to an electronic device 14 (after an initial unconnected period), resistor 1110 may help to ensure that transistor 1106 is initially turned on and contact 1004 is coupled to contact 1006 (e.g., that the power cutoff switch 900 is reset). Resistor 1110 may have any suitable resistance. As one example, the resistor 1110 may have a resistance of approximately one million ohms.

If desired, connector 38 may include structures that forces dendritic growth to occur first in selected locations within the connector 38. For example, a structure that encourages moisture-induced dendritic growth may be included in connector 38 at a location that is downstream from the cutoff switch. With this type of arrangement, circuitry in connector 38 may be able to effectively shut off power to the location where the dendritic growth arises (i.e., by opening the switch). This type of configuration may therefore help to avoid the need to provide additional circuitry outside of connector 38 to turn off power flowing into the connector 38 when dendritic growths form in the connector 38.

Figure 12:
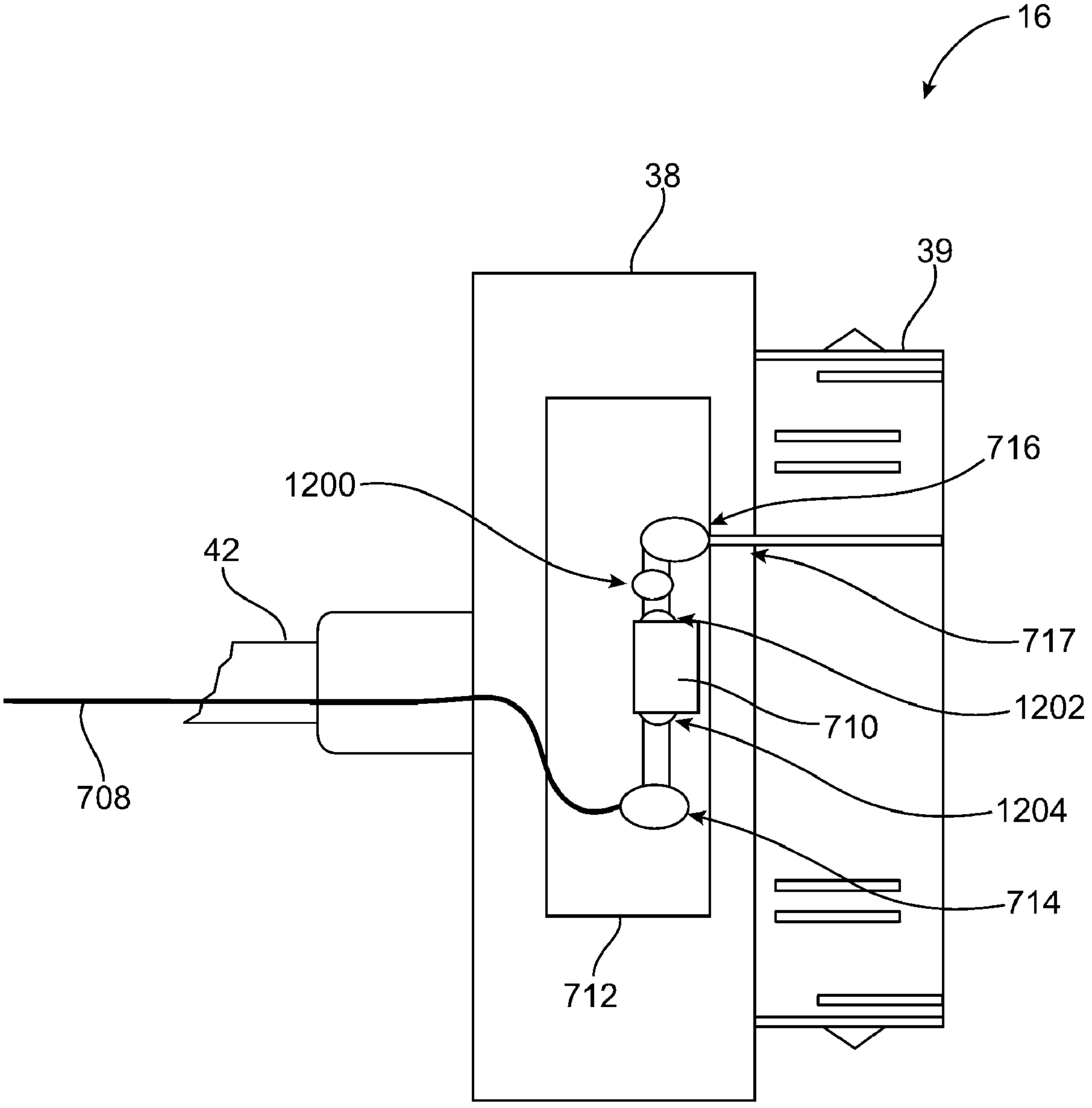
FIG. 12 is a top view of an illustrative connector that may be a part of a cable such as the cable of FIG. 5, that may include structures that encourage dendritic growth to occur in a particular location within the connector, and that may include circuitry which can deactivate power supply lines that pass through the particular location in accordance with an embodiment of the present invention.

An example of this type of arrangement is shown in FIG. 12. As shown in FIG. 12, connector 38 may include a dendritic-growth-promotion structure 1200 that encourages dendritic growth. With one suitable arrangement, dendritic growth structure 1200 may be formed on printed circuit board 712 (FIG. 7).

With the arrangement shown in FIG. 12, dendritic growth structure 1200 may encourage any dendritic growths that form in connector 38 to form at a location that is downstream from thermal protection circuitry 710 in a conductive path from conductor 708 to pin 717 (e.g., on side 1202 of thermal protection circuitry 710). This may help to ensure that circuitry within connector 38 such as circuitry 710 can shut off the power to the portions of the connector that have shorts developing from the dendritic growths. In contrast, if a dendritic growth were to form before thermal protection circuitry 710 (e.g., upstream from circuitry 710 on side 1204 of circuitry 710), thermal protection circuitry 710 might not be able to shut off power to the affected areas. The dendritic-growth-promotion structure therefore helps to ensure that any moisture-induced shorts will arise in a location of connector 38 where power delivery to the short can be interrupted when a rise in temperature is detected.

With one suitable arrangement, when connector 38 includes a dendritic growth structure 1200 that encourages dendritic growth, thermal protection circuitry 710 may be configured to shut off power to structure 1200 only after the connector 38 exceeds a relatively high temperature. In addition or alternatively, circuitry 710 may be configured to shut off power to structure 1200 only after an extended period of high temperature in connector 38. Arrangements such as these may be used to dry out connector 38 (as dendritic structures typically form in the presence of moisture) before circuitry 710 shuts off power. Because circuitry 710 is configured to dry out connector 38 in this way before shutting off power to connector 38, the risk of additional dendritic structures forming (in potentially unprotected areas) may be reduced as the moisture typically required to form dendritic structures may be removed from connector 38.

Figure 13:
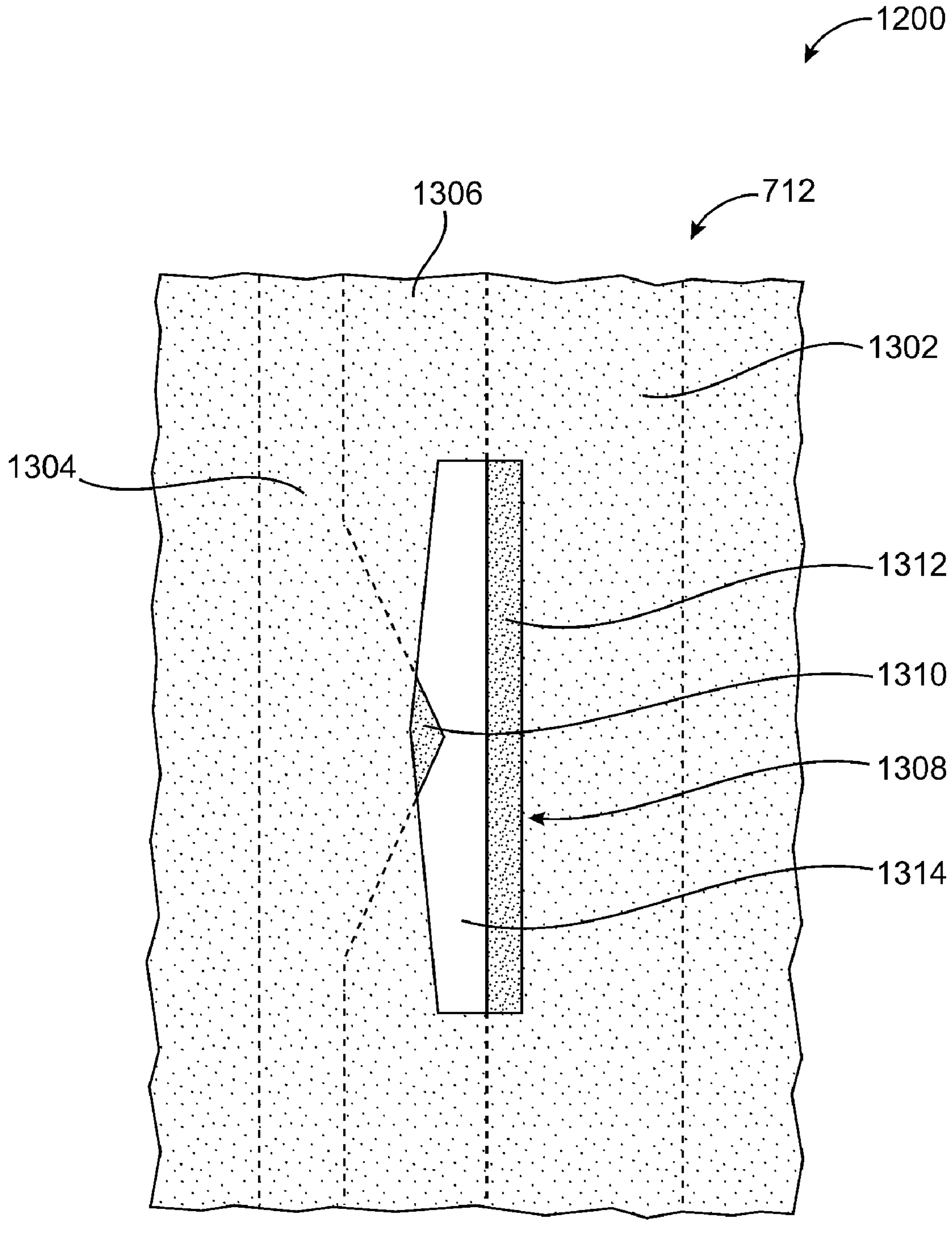
FIG. 13 is a top view of an illustrative structure that may encourage dendritic growth to occur at a particular location and that may be a part of a connector such as the connector of FIG. 12 in accordance with an embodiment of the present invention.

An example of a structure that may be included in a connector such as connector 38 to encourage dendritic growths to form at a particular location is shown in FIG. 13. As shown in the example of FIG. 13, dendritic-growth-promotion structure 1200 may be formed on a printed circuit board such as printed circuit board 712 of FIG. 12.

Dendritic growth structure 1200 may include adjacent traces that are at different potentials. For example, structure 1200 may include a trace 1302 at a ground voltage (e.g., a voltage conveyed over conductor 706) and a trace 1304 at a positive power supply voltage (e.g., a voltage conveyed over conductor 708). Traces 1302 and 1304 may be formed from any suitable material. As one example, traces 1302 and 1304 may be formed from copper lines on printed circuit board 712.

If desired, printed circuit board 712 may include a solder mask such as solder mask 1306. Solder mask 1306 may cover all of the portions of the printed circuit board that are shown FIG. 13 except for opening 1308. Solder mask 1306 may be formed from a polymer or other material that serves as a protective coating for the traces in printed circuit board 712 such as traces 1302 and 1304. For example, mask 1306 may be a lacquer-like layer of polymer that provides a protective coating for the traces of printed circuit board 712 and prevents solder from bridging between traces, thereby preventing short circuits caused by solder bridging traces. Mask 1306 may be formed from epoxy that is printed in a pattern onto printed circuit board 712 (e.g., using a silkscreen printing process). Mask 1306 may be formed from a liquid photoimageable solder mask, a dry film photoimageable solder mask, or any other suitable mask. If desired, mask 1306 may be applied to printed circuit board 712 using a silkscreen printing process, a vacuum lamination process, or any other suitable process. If desired, mask 1306 may be thermally cured after being applied to printed circuit board 712.

With one suitable arrangement, one or both of the traces 1302 and 1304 may include structures that increase the voltage gradient between the two traces, thereby encouraging dendritic growth. For example, the positive power supply trace 1304 may include a triangular pointed portion 1310 that extends towards the ground supply trace 1302. The portion 1310 of trace 1304 may therefore create a region of relatively high voltage gradient (e.g., a large voltage difference across a small gap) between traces 1302 and 1304.

To help encourage dendritic growth, region 1308 of printed circuit board 712 may not be covered by the material of solder mask 1306. In particular, solder mask 1306 may have portions that define a hole such as hole 1308 over trace 1304, trace 1302, and extending pointed member 1310 of trace 1304 (e.g., extending portion 1310). As one example, the tip of portion 1310 of trace 1304 and portion 1312 of trace 1302 may be uncovered (e.g., solder mask 1306 may not cover portions 1310 and 1312). This type of arrangement may help to promote dendritic formation in the gap between traces 1302 and 1304. In addition, the exposed portions of printed circuit board 712 such as region 1314 (e.g., a dielectric between traces 1302 and 1304) may form a liquid reservoir. Because the formation of dendritic growths is induced by the presence of water, liquid reservoirs such as region 1314 may help to encourage dendritic growths by providing a storage location for liquid and by directing the liquid towards the high voltage gradient (e.g., towards the gap formed between the tip of structure 1310 and the left-hand edge of line 1302 in region 1312). The shape of the conductive structures in the solder mask opening of FIG. 13 is merely illustrative. Any suitable shapes may be used (e.g., with two or more pointed extending regions, with non-triangular extending regions, etc.).

Figure 14:
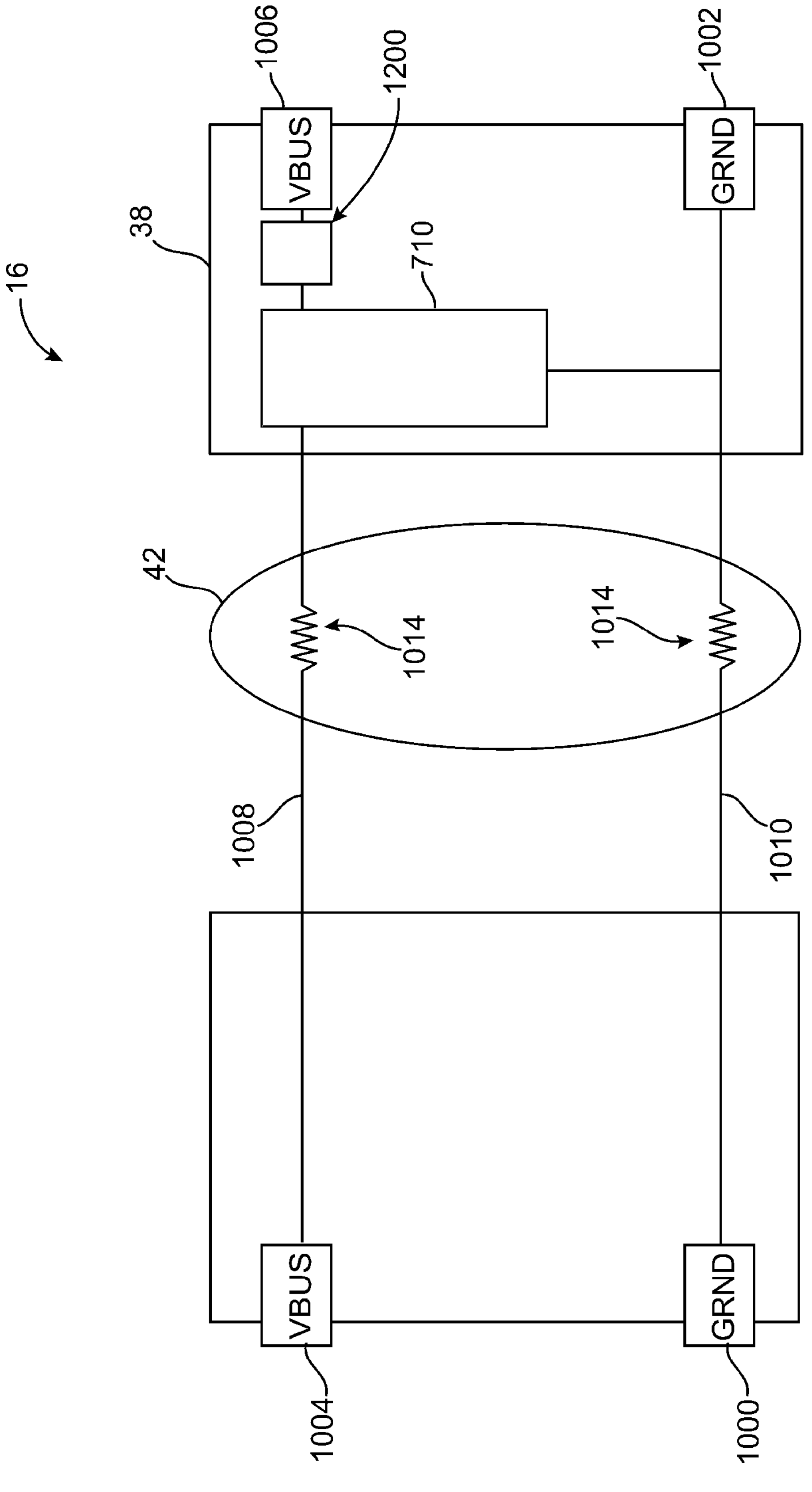
FIG. 14 is a circuit diagram of an illustrative cable that may include the connector of FIG. 12 showing how structures that encourage dendritic growth to occur in a particular location may be used in conjunction with thermal protection circuitry which can deactivate power supply lines in the connector in response to rising temperatures in the connector in accordance with an embodiment of the present invention.

An illustrative circuit diagram of the arrangement of FIG. 13 is shown in FIG. 14. As shown in FIG. 14, cable 16 may convey two voltages between external contacts in connector 38 and external contacts in connector 40. For example, cable 16 may convey a ground voltage between ground (GRND) contact 1000 of connector 40 and ground (GRND) contact 1002 of connector 38. Cable 16 may convey a positive power supply voltage between contact 1004 of connector 40 and contact 1006 of connector 38 (e.g., the VBUS contacts 1004 and 1006). With one suitable arrangement, the positive power supply voltage may be conveyed over conductor 1008 and the ground voltage may be conveyed over conductor 1010. The circuit diagram of FIG. 14 also shows how each of the conductors in path 42 may have a non-zero resistance 1014.

As shown in the example of FIG. 14, thermal protection circuitry 710 (FIG. 12) may be formed in connector 38 at a location that is interposed between dendritic growth structure 1200 and conductor 1008 in path 42. With this type of arrangement, dendritic growth structure 1200 may encourage dendrites to form in the location of structure 1200 rather than at other locations in connector 38. If a dendrite does form in structure 1200, the dendrite may short together conductive lines at the positive voltage of contact 1006 and the ground voltage of contact 1002, thereby heating up the connector 38.

Thermal protection circuitry 710 may detect a temperature rise in connector 38 and, in response, may shut off power to contact 1006 (e.g., circuitry 710 may isolate conductor 1008 and structure 1200 from each other). With one suitable arrangement, thermal protection circuitry 710 may be configured to shut off power to contact 1006 after the temperature of connector 38 has exceeded a threshold voltage. The threshold voltage may be less than 85° C., 85° C., 90° C., 95° C., 100° C., greater than 100° C., or any other suitable threshold temperature. If desired, the thermal protection circuitry 710 may be configured to shut off power to contact 1006 only after the threshold temperature has been exceeded for a given time period such as 1 minute, 5 minutes, 10 minutes, 30 minutes, etc. With this type of arrangement, thermal protection circuitry 710 may be used to allow connector 38 to heat up enough to dry out the connector 38 and prevent any additional dendrites from forming.

Figure 15:
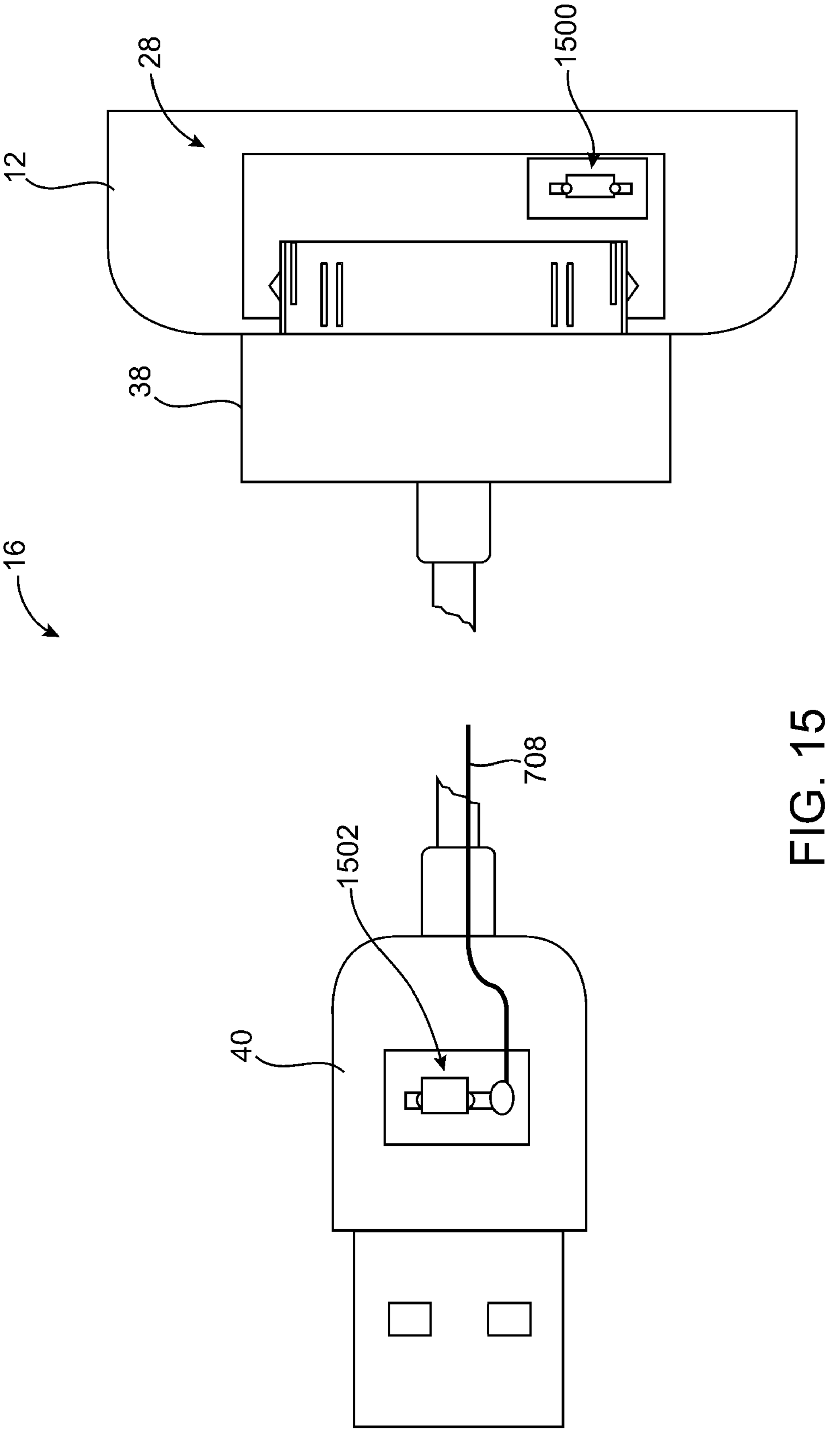
FIG. 15 is a top view of an illustrative cable coupled to an electronic device showing how the electronic device may include a temperature sensor located in proximity to a first connector in the cable and how the cable may have a second connector with a power cutoff switch that can be used to deactivate power supply lines to the second connector in response to rising temperatures in the second connector in accordance with an embodiment of the present invention.

If desired, thermal protection circuitry may be provided in electronic device 12. For example, thermal protection circuitry in system 10 may include a temperature sensor in electronic device 12 that senses the temperature of connector 38 of cable 16 and a power cutoff switch in connector 40 of cable 16 as shown in the example of FIG. 15. With this type of arrangement, temperature sensor 1500 in electronic device 12 may be able to sense the temperature of connector 38 of cable 16 and convey signals to cutoff switch 1502 representative of the temperature of connector 38. If a dendritic structure forms in connector 38 and forms a short that heats up connector 38, temperature sensor 1500 may detect the increasing temperature and direct power cutoff switch 1502 to shut off power to connector 38 (e.g., to shut off a positive power supply voltage on conductor 708). If desired, temperature sensor 1500 may be included in connector 28 of electronic device 12.

Figure 16:
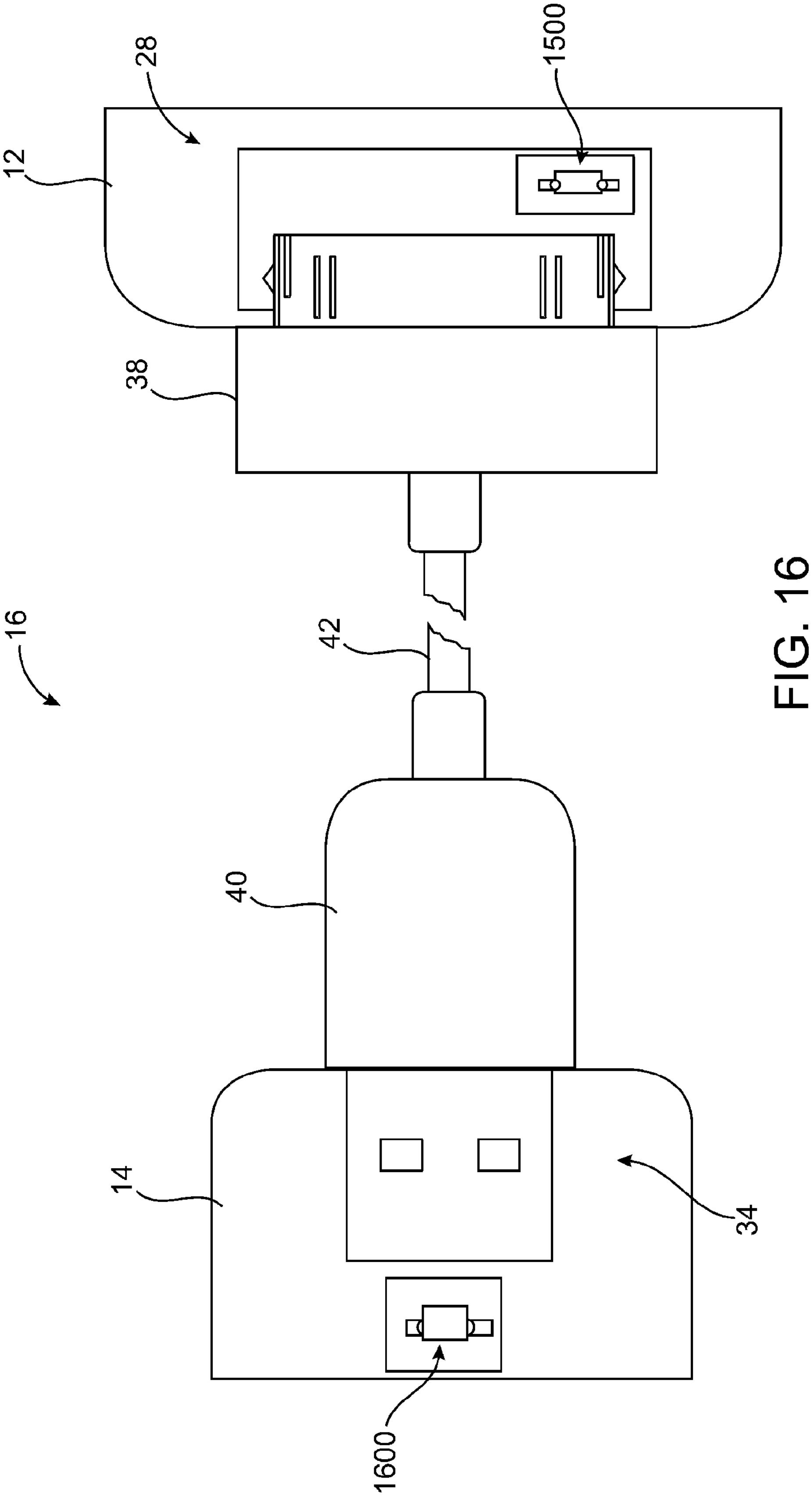
FIG. 16 is a top view of an illustrative cable coupled between a first electronic device and a second electronic device showing how the first electronic device may include a temperature sensor in proximity to a connector in the cable and the second electronic device may include a power cutoff switch that can deactivate power supply lines to the cable and to the connector in response to rising temperatures in the connector in accordance with an embodiment of the present invention.

With another suitable arrangement, thermal protection circuitry may be provided in electronic device 12 and in electronic device 14. As shown in the example of FIG. 16, thermal protection circuitry in system 10 may include temperature sensor 1500 in electronic device 12 (e.g., sensor 1500 in connector 28) and a cutoff switch 1600 in electronic device 14. With this type of arrangement, sensor 1500 may determine the temperature of connector 38 and may relay signals to cutoff switch 1600 indicative of the temperature of connector 38. When the temperature of connector 38 exceeds a threshold level, cutoff switch 1600 may cut off power to cable 16. With one suitable arrangement, cutoff switch 1600 may only cut off power signals and data signals may continue to be conveyed between electronic devices 12 and 14. If desired, cutoff switch 1600 can be incorporated into connector 34 (FIG. 3). With another suitable arrangement, cutoff switch 1600 can be incorporated into connector 29 (FIG. 4).

Figure 17:
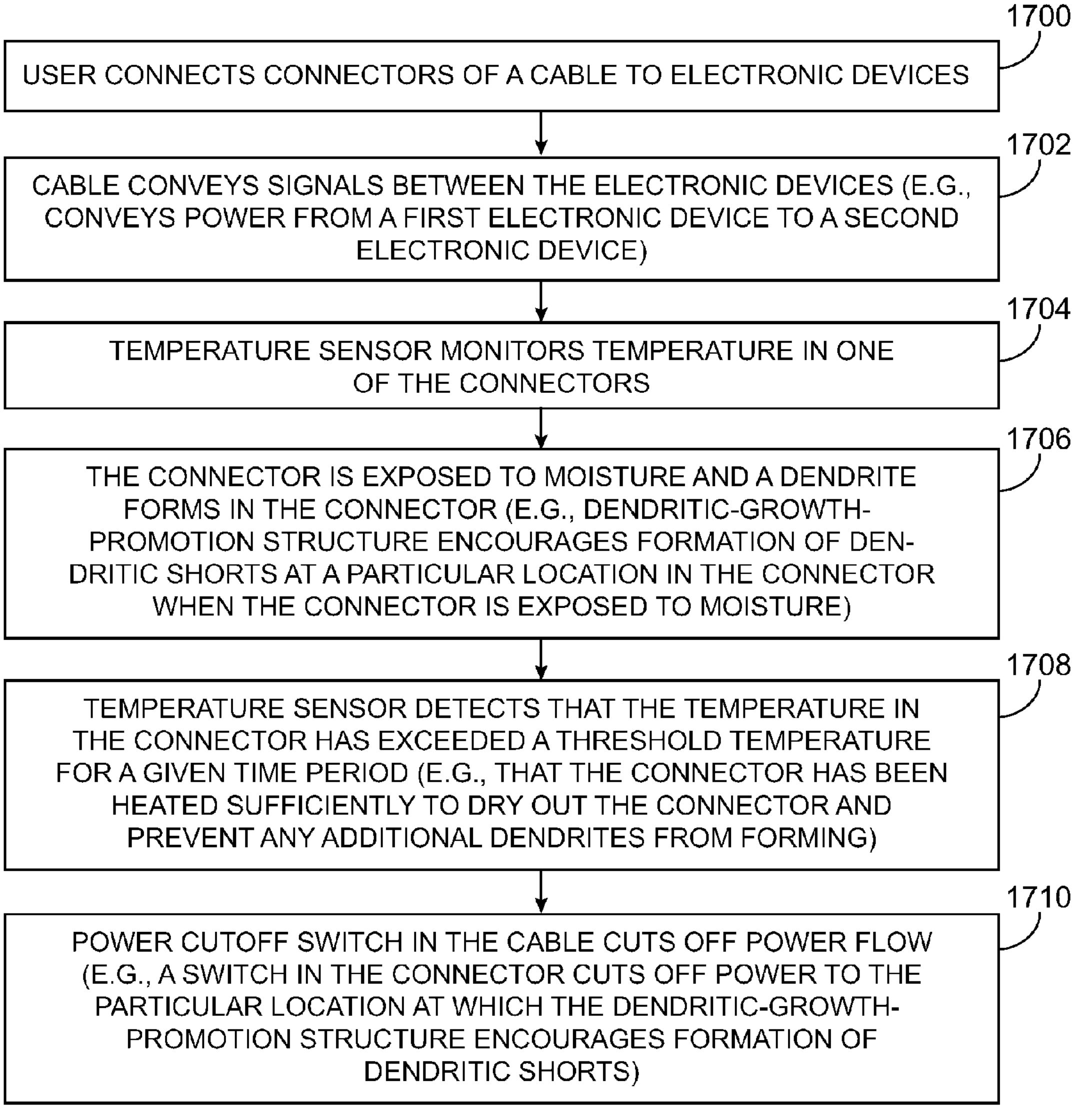
FIG. 17 is a flow chart of illustrative steps involved in using a cable that may form a communications path between two electronic devices and that may include thermal protection circuits and structures in accordance with an embodiment of the present invention.

Illustrative steps involved in using thermal protection circuits and structures to protect cable 16 are shown in FIG. 17. In the example of FIG. 17, cable 16 may be used to convey signals such as power signals between two electronic devices such as electronic devices 12 and 14.

At step 1700, a user may connect cable 16 to electronic devices 12 and 14 (as examples). As one example, the user may connect connector 40 (FIG. 5) to electronic device 14 and may connect connector 38 to electronic device 12. The process of connecting cable 16 to electronic devices 12 and 14 may involve creating a wired path in which contacts in the connectors 38 and 40 of cable 16 mate with corresponding contacts in the connectors of electronic devices 12 and 14 and thereby connect the conductive lines of cable 16 between device 12 and device 14.

At step 1702, cable 16 may convey signals between electronic devices 12 and 14. As one example, cable 16 may convey power signals from electronic device 14 to electronic device 12 (e.g., to power electronic device 12 and/or to charge a battery in electronic device 12). If desired, cable 16 may convey data signals between the electronic devices 12 and 14.

At step 1704, a temperature sensor may be used to monitor temperature in one of the connectors of cable 16. For example, a temperature sensor in connector 38 such as a temperature sensor in circuitry 710, temperature sensor 802, temperature sensor 902, or a temperature sensor in circuitry 1100 may be used to monitor temperature in connector 38. With another suitable arrangement, a temperature sensor 1500 in electronic device 12 may be used to monitor temperature in connector 38.

At step 1706, connector 38 may be exposed to moisture and, as a result, a dendrite may form in connector 38. As one example, dendritic-growth-promotion structure 1200 may encourage a dendritic short to form at a particular location in connector 38 when connector 38 is exposed to moisture (e.g., when moisture infiltrates connector 38). The formation of a dendrite in connector 38 may lead to a buildup of heat in connector 38.

At step 1708, the temperature sensor that is monitoring the temperature of connector 38 may detect that the temperature in the connector has exceeded a threshold temperature for a pre-determined time period (as an example). With this type of arrangement, the temperature sensor may be used in determining when the connector 38 has been heated sufficiently to dry out and remove any moisture that could lead to the formation of additional dendrites in connector 38.

At step 1710, a power cutoff switch such as a switch in circuitry 710, circuitry 800, circuitry 900, or circuitry 1502 of cable 16 may be used to cut off power flow in cable 16. The power cutoff switch may wait a given period of time after the temperature sensor first detects a temperature above a certain threshold to ensure that any moisture in connector 38 is removed. If desired, the given period of time may be variable based on the actual temperature detected in the connector 38 by the temperature sensor. For example, the given period of time may be relatively short when the actual temperature is above a second higher threshold and may be relatively long when the actual temperature is lower than the second higher threshold. With another suitable arrangement, a power cutoff switch in circuitry 1600 of electronic device 14 may be used to cut off power flow in cable 16. As one example, a power cutoff switch in circuitry 710 may cut off power to the particular location in connector 38 at which dendritic-growth-promotion structure 1200 encourages formation of dendritic shorts.

With another suitable arrangement, power measuring circuitry that measures the amount of power that is lost in transmission between electronic device 12 and 14 through cable 16 may be used in determining whether cable 16 has failed (e.g., when a dendritic short has formed in cable 16 or in one of the connectors 38 and 40). If desired, the power measuring circuitry may be used in place of or in addition to the temperature sensors used in any of the examples described herein. The power measuring circuitry may be provided in cable 16, in electronic device 12, in electronic device 14, or in any suitable combination of cable 16 and electronic devices 12 and 14.

As one example, power measuring circuitry in electronic device 14 may measure the amount of power being delivered to cable 16 while power measuring circuitry in electronic device 12 can measure the amount of power being received through cable 16. Electronic devices 12 and 14 may then communicate to determine the difference between the power being delivered to cable 16 and the power being received through cable 16. If the amount of power being lost during transmission through cable 16 exceeds a threshold limit (e.g., 1 watt, 5 watts, 10 watts, etc.), electronic device 12 and/or device 14 may determine, based on this information, that a short has likely formed in cable 16 and that cable 16 is likely being heated from the short (e.g., because lost power may typically be transformed into heat). In response to determining that the amount of power being lost exceeds the threshold limit, electronic device 12 and/or device 14 may cut off power flow in cable 16.

The foregoing is merely illustrative of the principles of this invention and various modifications can be made by those skilled in the art without departing from the scope and spirit of the invention.

What is claimed is:

1. A cable comprising:

a connector at one end of the cable;

a pair of conductors in the connector; and a structure at a given location in the connector that encourages formation of dendritic shorts between the pair of conductors at the given location upon exposure of the connector to moisture.

2. The cable defined in claim 1 wherein the connector includes a printed circuit board and wherein the pair of conductors comprise two traces in the printed circuit board.

3. The cable defined in claim 2 wherein the printed circuit board includes a mask that covers the traces and wherein the structure that encourages formation of dendritic shorts comprises portions of the printed circuit board and the traces that are not covered by the mask.

4. The cable defined in claim 2 wherein the two traces are parallel to each other and are separated by a gap and wherein the structure that encourages formation of dendritic shorts comprises a pointed conductive member that extends across part of the gap.

5. The cable defined in claim 1 further comprising a power cutoff switch that selectively blocks power delivery to the given location.

6. The cable defined in claim 5 further comprising a temperature sensor in the connector, wherein the power cutoff switch selectively blocks power delivery to the given location based on signals from the temperature sensor.

7. The cable defined in claim 5 further comprising:

an additional connector at the other end of the cable; and a plurality of conductors between the connector and the additional connector, wherein the power cutoff switch is interposed between the structure that encourages formation of dendritic shorts and the plurality of conductors between the connector and the additional connector.

8. The cable defined in claim 7 wherein the power cutoff switch comprises an integrated circuit having a temperature sensor that measures the temperature of the connector.

9. Circuitry comprising:

a first trace that carries a first voltage;

a second trace that carries a second voltage and that is separated from the first trace by a gap, wherein the second trace includes an extending member that extends towards the first trace and narrows the gap; and a mask that covers portions of the first and second traces, wherein the mask has a hole over a least a portion of the extending member and wherein the extending member and the hole encourage formation of dendritic shorts upon exposure to moisture.

10. The circuitry defined in claim 9 wherein the first and second traces respectively comprise first and second copper traces.

11. The circuitry defined in claim 9 further comprising a printed circuit board on which the first and second traces are formed.

12. The circuit defined in claim 9 wherein the hole in the mask extends over a portion of the first trace opposite the extending member.

13. The circuitry defined in claim 9 further comprising:

a cable including a plurality of conductors; and a connector at one end of the cable in which the extending member is located, wherein the connector has pins that receive power supply signals from the conductors through the first and second traces.

14. The circuitry defined in claim 13 wherein the connector comprises a 30-pin connector.

15. The circuitry defined in claim 9 further comprising:

a connector in which the extending member is located;

a plurality of conductors connected to respective pins in the connector;

a temperature sensor that measures temperature in the connector; and a switch between the second trace and a given one of the plurality of conductors, wherein the switch is configured to isolate the second trace from the given conductor when the temperature in the connector exceeds a given threshold.

16. A printed circuit board for a connector, the printed circuit board comprising:

a first trace; and a second trace that is separated from the first trace by a gap, wherein the second trace includes an extending portion that extends towards the first trace and narrows the gap and wherein the extending portion encourages formation of dendritic shorts in the gap between the first and second traces upon exposure of the printed circuit board to moisture.

17. The printed circuit board defined in claim 16 further comprising:

a mask that covers portions of the first and second traces, wherein the mask has a hole over at least a portion of the extending portion and the first trace.

18. The printed circuit board defined in claim 17 wherein the first and second traces are parallel to each other and wherein the extending portion comprises an extending portion with a point at the narrowest portion of the gap.

19. The printed circuit board defined in claim 17 further comprising a temperature sensor that measures temperature in the printed circuit board.

20. The printed circuit board defined in claim 19 further comprising a power cutoff switch that blocks power flow to a given one of the first and second traces when the temperature measured by the temperature sensor exceeds a given threshold for a given period of time.

* * * * *